(12) United States Patent
Deng et al.

(10) Patent No.: US 10,306,440 B2
(45) Date of Patent: May 28, 2019

(54) COMMUNICATION METHOD, COMMUNICATIONS SYSTEM, AND APPARATUS

(71) Applicant: Huawei Technologies Co., Ltd., Shenzhen (CN)

(72) Inventors: Tianle Deng, Shanghai (CN); Kaijie Zhou, Shanghai (CN)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

(21) Appl. No.: 15/637,907

(22) Filed: Jun. 29, 2017

(65) Prior Publication Data

US 2017/0303066 A1    Oct. 19, 2017

Related U.S. Application Data

(63) Continuation of application No. PCT/CN2015/085339, filed on Jul. 28, 2015.

(51) Int. Cl.
*H04W 4/70* (2018.01)
*H04W 4/06* (2009.01)
(Continued)

(52) U.S. Cl.
CPC ............. *H04W 4/70* (2018.02); *H04W 4/06* (2013.01); *H04W 8/186* (2013.01);
(Continued)

(58) Field of Classification Search
CPC ......... H04W 4/70; H04W 4/06; H04W 8/186; H04W 48/12; H04W 72/04; H04W 72/042; H04W 72/0446; H04W 72/0453
See application file for complete search history.

(56) References Cited

U.S. PATENT DOCUMENTS 5,887,252 A * 3/1999 Noneman ............. H04W 76/10
                                                455/463
6,983,150 B2 * 1/2006 Dixon ..................... H04J 13/16
                                                455/447
(Continued)

FOREIGN PATENT DOCUMENTS

CN      101682417 A     3/2010
CN      102158963 A     8/2011
(Continued)

OTHER PUBLICATIONS

Ljungberg, "Long term evolution for control system applications in a smart grid context," HYCON2 Workshop on Energy, Sep. 2012, 21 pages.
(Continued)

*Primary Examiner* — Dominic E Rego
(74) *Attorney, Agent, or Firm* — Slater Matsil, LLP

(57) ABSTRACT

The present invention discloses a communication method, including obtaining, by a base station, resource configuration information of a machine type communications MTC service, where the resource configuration information of the MTC service includes at least one of information about an uplink MTC resource or information about a downlink MTC resource; sending, by the base station, the resource configuration information of the MTC service to an MTC terminal; and performing, by the base station, MTC service transmission with the MTC terminal by using an MTC subframe in the uplink MTC resource and/or the downlink MTC resource. According to the method, delay requirements of the MTC service can be satisfied, and communication quality of the MTC service can be ensured.

20 Claims, 10 Drawing Sheets

(51) Int. Cl.
*H04W 72/04* (2009.01)
*H04W 8/18* (2009.01)
*H04W 48/12* (2009.01)

(52) U.S. Cl.
CPC .......... *H04W 72/042* (2013.01); *H04W 48/12* (2013.01); *H04W 72/04* (2013.01); *H04W 72/0446* (2013.01); *H04W 72/0453* (2013.01)

(56) References Cited

U.S. PATENT DOCUMENTS

| | | | | |
|---|---|---|---|---|
| 7,630,332 | B1* | 12/2009 | Elliott | H04W 72/0446 370/321 |
| 9,736,620 | B2* | 8/2017 | Wu | H04W 72/0446 |
| 2007/0237212 | A1* | 10/2007 | Kent | H04B 1/70735 375/149 |
| 2008/0279143 | A1 | 11/2008 | Lee et al. | |
| 2009/0036138 | A1* | 2/2009 | Horn | H04L 47/824 455/450 |
| 2010/0165931 | A1* | 7/2010 | Nimbalker | H04L 1/0028 370/329 |
| 2012/0099854 | A1* | 4/2012 | Fourcand | H04L 43/0858 398/25 |
| 2013/0077583 | A1* | 3/2013 | Kim | H04W 72/042 370/329 |
| 2013/0100899 | A1 | 4/2013 | Kim et al. | |
| 2013/0100900 | A1 | 4/2013 | Lee et al. | |
| 2013/0155974 | A1 | 6/2013 | Papasakellariou et al. | |
| 2013/0163556 | A1 | 6/2013 | Lee et al. | |
| 2013/0176995 | A1 | 7/2013 | Park et al. | |
| 2013/0242966 | A1* | 9/2013 | Zhou | H04W 48/20 370/338 |
| 2013/0250878 | A1* | 9/2013 | Sayana | H04W 48/12 370/329 |
| 2013/0288608 | A1 | 10/2013 | Fwu et al. | |
| 2013/0315159 | A1 | 11/2013 | Xia et al. | |
| 2013/0343362 | A1 | 12/2013 | Huang et al. | |
| 2014/0086214 | A1* | 3/2014 | Hong | H04W 4/70 370/332 |
| 2014/0093013 | A1* | 4/2014 | Ouchi | H04B 7/0689 375/295 |
| 2014/0126497 | A1 | 5/2014 | Xu et al. | |
| 2014/0133589 | A1* | 5/2014 | Ouchi | H04B 7/0689 375/260 |
| 2014/0133599 | A1* | 5/2014 | Ouchi | H04B 7/10 375/295 |
| 2014/0143390 | A1* | 5/2014 | Umapathy | H04L 41/0813 709/221 |
| 2014/0143395 | A1* | 5/2014 | Geltner | H04W 4/70 709/223 |
| 2014/0153417 | A1* | 6/2014 | Gupta | H04W 52/0219 370/252 |
| 2014/0198776 | A1* | 7/2014 | Nammi | H04B 7/0486 370/336 |
| 2014/0198780 | A1 | 7/2014 | Qi et al. | |
| 2015/0016377 | A1* | 1/2015 | Kim | H04B 7/2615 370/329 |
| 2015/0131465 | A1* | 5/2015 | Dalsgaard | H04W 24/10 370/252 |

FOREIGN PATENT DOCUMENTS

| | | |
|---|---|---|
| CN | 102316535 A | 1/2012 |
| CN | 102651908 A | 8/2012 |
| CN | 102804690 A | 11/2012 |
| CN | 103200683 A | 7/2013 |
| CN | 103517431 A | 1/2014 |
| EP | 2961239 A1 | 12/2015 |
| KR | 20080099825 A | 11/2008 |
| WO | 2014129465 A1 | 8/2014 |

OTHER PUBLICATIONS

International Standard, Norme Internationale, IEC 61850-5, Edition 2.0 Jan. 2013," Communication networks and systems for power utility automation—Part 5: Communication requirements for functions and device models," Jan. 2013, 23 pages.

* cited by examiner

COMMUNICATION METHOD, COMMUNICATIONS SYSTEM, AND APPARATUS

CROSS-REFERENCE TO RELATED APPLICATIONS

This application is a continuation of International Application No. PCT/CN2015/085339, filed on Jul. 28, 2015, which claims priority to International Application No. PCT/CN2014/096020, filed on Dec. 31, 2014. The disclosures of the aforementioned applications are hereby incorporated by reference in their entireties.

TECHNICAL FIELD

The present invention relates to the wireless communications technologies, and in particular, to a communication method, a communications system, and an apparatus.

BACKGROUND

With development of communications technologies, machine type communications (MTC) becomes increasingly popular. Wireless communications technologies need to be applied in more MTC. For example, wireless communication needs to be performed between machines in MTC such as smart grids, intelligent transportation, telemedicine, and oilfield and mine monitoring.

In the prior art, when user equipment (UE) needs to perform uplink data transmission, the UE sends a scheduling request (SR) to a base station (BS), the base station sends resource allocation information to the UE, and the UE performs uplink data transmission in a resource allocated according to the resource allocation information.

In the prior art, a delay of an uplink data transmission process is relatively long. In some MTC applications, there is a special requirement for a delay. The delay of the uplink data transmission process in the prior art cannot satisfy requirements of MTC applications.

SUMMARY

The present invention provides a communication method, a communications system, and an apparatus, to satisfy a delay requirement of an MTC service.

A first aspect of embodiments of the present invention provides a communication method. The method includes obtaining, by a base station, resource configuration information of an MTC service, where the resource configuration information of the MTC service includes information about an uplink MTC resource and information about a downlink MTC resource. The method includes sending, by the base station, the resource configuration information of the MTC service to an MTC terminal; and sending, by the base station, downlink control information of the MTC service to the MTC terminal. The downlink control information indicates information about a resource used for transmitting downlink data of the MTC service, and the resource used for transmitting the downlink data of the MTC service is located in the downlink MTC resource. The method includes sending, by the base station, the downlink data of the MTC service to the MTC terminal, in the resource used for transmitting the downlink data of the MTC service, by using the MTC subframe as a transmission period. The quantity of the symbols included in the MTC subframe is configured according to a transmission delay of the MTC service. The method includes receiving uplink data of the MTC service that is sent by the MTC terminal in the uplink MTC resource by using the MTC subframe as a transmission period.

A second aspect of the embodiments of the present invention provides a communication method. The method includes receiving, by an MTC terminal, resource configuration information of an MTC service that is sent by a base station, where the resource configuration information of the MTC service includes information about an uplink MTC resource and information about a downlink MTC resource. The method includes receiving, by the MTC terminal, downlink control information of the MTC service that is sent by the base station, where the downlink control information indicates information about a resource used for transmitting downlink data of the MTC service, and the resource used for transmitting the downlink data of the MTC service is located in the downlink MTC resource; receiving, by the MTC terminal, the downlink data of the MTC service that is sent by the base station to the MTC terminal, in the resource used for transmitting the downlink data of the MTC service, by using the MTC subframe as a transmission period, where the quantity of the symbols included in the MTC subframe is configured according to a transmission delay of the MTC service; and sending, by the MTC terminal, uplink data of the MTC service in the uplink MTC resource by using the MTC subframe as a transmission period.

According to the foregoing method provided in the embodiments of the present invention, when an MTC terminal has an MTC service, a base station sends information about an uplink MTC resource and information about a downlink MTC resource to the MTC terminal, and sends downlink control information of the MTC service to the MTC terminal, so that the MTC terminal may know a resource used for transmitting downlink data of the MTC service and a resource used for transmitting uplink data of the MTC service, and the base station and the MTC terminal transmits the uplink data and the downlink data of the MTC service in an MTC subframe, where a quantity of symbols in the MTC subframe is configured by using a transmission delay of the MTC service. Therefore, delay requirements of the MTC service can be satisfied, and communication quality of the MTC service can be ensured.

A third aspect of the embodiments of the present invention provides a communication method. The method includes: obtaining, by a base station, resource configuration information of a machine type communications MTC service, where the resource configuration information of the MTC service includes at least one of information about an uplink MTC resource or information about a downlink MTC resource; sending, by the base station, the resource configuration information of the MTC service to an MTC terminal; and performing, by the base station, MTC service transmission with the MTC terminal by using an MTC subframe in the uplink MTC resource and/or the downlink MTC resource.

A fourth aspect of the embodiments of the present invention provides a communication method. The method includes receiving, by a machine type communications MTC terminal, resource configuration information of an MTC service that is sent by a base station, where the resource configuration information of the MTC service includes at least one of information about an uplink MTC resource or information about a downlink MTC resource. The method includes determining, by the MTC terminal, the uplink MTC resource and/or the downlink MTC resource according to the resource configuration information of the MTC service; and performing, by the MTC terminal, MTC service transmission with the base station by using an MTC subframe in the uplink MTC resource and/or the downlink MTC resource.

In an implementation manner of the first aspect, the second aspect, the third aspect, or the fourth aspect of the embodiments of the present invention, a quantity of symbols included in the MTC subframe is less than a quantity of symbols included in a standard subframe. According to this implementation manner, an MTC service having a requirement for a short transmission delay can be implemented.

In an implementation manner of the first aspect, the second aspect, the third aspect, or the fourth aspect of the embodiments of the present invention, or in a further implementation manner of the implementation manner of the first aspect, the second aspect, the third aspect, or the fourth aspect, the resource configuration information of the MTC service further includes configuration information of the MTC subframe, and the configuration information of the MTC subframe includes the quantity of the symbols included in the MTC subframe.

In an implementation manner of the first aspect, the second aspect, the third aspect, or the fourth aspect of the embodiments of the present invention, or in a further implementation manner of the implementation manner of the first aspect, the second aspect, the third aspect, or the fourth aspect, the base station may send the configuration information of the MTC subframe to the MTC terminal by using a PDCCH or an enhanced PDCCH in the standard subframe. In this implementation manner, the base station may quickly and flexibly send the information about the uplink MTC resource and the information about the downlink MTC resource to the MTC terminal, and when a requirement for the transmission delay of the MTC service changes, may quickly update the resource configuration information of the MTC service. Sending by using the standard subframe may not need to change configurations of an existing system, is compatible with an existing communications specification, and reduces costs of MTC service communications.

In an implementation manner of the first aspect, the second aspect, the third aspect, or the fourth aspect of the embodiments of the present invention, or in a further implementation manner of the implementation manner of the first aspect, the second aspect, the third aspect, or the fourth aspect, the base station may send the configuration information of the MTC subframe to the MTC terminal by using the standard subframe and a broadcast message, or send the configuration information of the MTC subframe to the MTC terminal by using the standard subframe and radio resource control signaling. In this implementation manner, signaling overheads of the system can be reduced. In addition, sending by using the standard subframe may not need to change configurations of an existing system, is compatible with an existing communications specification, and reduces costs of MTC service communications.

In an implementation manner of the first aspect, the second aspect, the third aspect, or the fourth aspect of the embodiments of the present invention, or in a further implementation manner of the implementation manner of the first aspect, the second aspect, the third aspect, or the fourth aspect, the base station is a macro base station or a small cell, and the macro base station or the small cell may perform communication with a non-MTC terminal by using the standard subframe. The base station may perform communication with a non-MTC terminal by using the standard subframe on a same frequency band.

In an implementation manner of the first aspect, the second aspect, the third aspect, or the fourth aspect of the embodiments of the present invention, or in a further implementation manner of the implementation manner of the first aspect, the second aspect, the third aspect, or the fourth aspect, the base station sends, by using a first carrier, the resource configuration information of the MTC service to the MTC terminal; the base station sends, by using a second carrier, the downlink data of the MTC service to the MTC terminal in the resource used for transmitting the downlink data of the MTC service by using the MTC subframe as a transmission period; and the base station receives the uplink data of the MTC service that is sent, by using a third carrier, by the MTC terminal in the uplink MTC resource by using the MTC subframe as a transmission period. The base station can send the resource configuration information of the MTC service and transmit the uplink and downlink data of the MTC service on different carriers, so as to fully use a frequency resource in the system.

In an implementation manner of the first aspect, the second aspect, the third aspect, or the fourth aspect of the embodiments of the present invention, or in a further implementation manner of the implementation manner of the first aspect, the second aspect, the third aspect, or the fourth aspect, the sending, by the base station, downlink control information of the MTC service to the MTC terminal includes: sending, by the base station, the downlink control information of the MTC service to the MTC terminal on a physical downlink control channel PDCCH of the downlink MTC resource by using the MTC subframe as a transmission period.

In an implementation manner of the first aspect, the second aspect, the third aspect, or the fourth aspect of the embodiments of the present invention, or in a further implementation manner of the implementation manner of the first aspect, the second aspect, the third aspect, or the fourth aspect, the sending, by the base station, downlink control information of the MTC service to the MTC terminal includes: sending, by the base station, the downlink control information of the MTC service to the MTC terminal on the PDCCH of the standard subframe.

A fifth aspect of the embodiments of the present invention provides a base station. The base station includes: a processing unit, configured to obtain resource configuration information of a machine type communications MTC service, where the resource configuration information of the MTC service includes information about an uplink MTC resource and information about a downlink MTC resource; and a transceiver unit, configured to: send the resource configuration information of the MTC service to an MTC terminal; and send downlink control information of the MTC service to the MTC terminal, where the downlink control information indicates information about a resource used for transmitting downlink data of the MTC service, and the resource used for transmitting the downlink data of the MTC service is located in the downlink MTC resource. The transceiver unit is further configured to: send the downlink data of the MTC service to the MTC terminal, in the resource used for transmitting the downlink data of the MTC service, by using the MTC subframe as a transmission period, where the quantity of the symbols included in the MTC subframe is configured according to a transmission delay of the MTC service; and receive uplink data of the MTC service that is sent by the MTC terminal in the uplink MTC resource by using the MTC subframe as a transmission period.

A sixth aspect of the embodiments of the present invention provides an MTC terminal, including a transceiver unit, configured to: receive resource configuration information of an MTC service that is sent by a base station, where the resource configuration information of the MTC service includes information about an uplink MTC resource and information about a downlink MTC resource; and receive downlink control information of the MTC service that is sent by the base station, where the downlink control information indicates information about a resource used for transmitting downlink data of the MTC service, and the resource used for transmitting the downlink data of the MTC service is located in the downlink MTC resource; and a processing unit, configured to obtain the uplink MTC resource and the resource used for transmitting the downlink data of the MTC service according to the resource configuration information of the MTC service and the downlink control information of the MTC service. The transceiver unit is further configured to: receive the downlink data of the MTC service that is sent by the base station to the MTC terminal, in the resource used for transmitting the downlink data of the MTC service, by using the MTC subframe as a transmission period, where the quantity of the symbols included in the MTC subframe is configured according to a transmission delay of the MTC service; and send uplink data of the MTC service in the uplink MTC resource by using the MTC subframe as a transmission period.

A seventh aspect of the embodiments of the present invention provides a base station, including a processing unit, configured to obtain resource configuration information of a machine type communications MTC service, where the resource configuration information of the MTC service includes at least one of information about an uplink MTC resource or information about a downlink MTC resource; and a transceiver unit, configured to: send the resource configuration information of the MTC service to an MTC terminal; and perform MTC service transmission with the MTC terminal by using an MTC subframe in the uplink MTC resource and/or the downlink MTC resource.

An eighth aspect of the embodiments of the present invention provides an MTC terminal, including a transceiver unit, configured to receive resource configuration information of an MTC service that is sent by a base station, where the resource configuration information of the MTC service includes at least one of information about an uplink MTC resource or information about a downlink MTC resource; and a processing unit, configured to determine the uplink MTC resource and/or the downlink MTC resource according to the resource configuration information of the MTC service, where the transceiver unit is further configured to perform MTC service transmission with the base station by using an MTC subframe in the uplink MTC resource and/or the downlink MTC resource.

Similar to the first aspect, the second aspect, the third aspect, or the fourth aspect of the embodiments of the present invention, by means of the base station or the MTC terminal provided in the embodiments of the present invention, delay requirements of the MTC service can be satisfied, and communication quality of the MTC service can be ensured.

A ninth aspect of the embodiments of the present invention further provides a communications system. The communications system may include the MTC terminal and the base station.

In an implementation manner of the ninth aspect of the embodiments of the present invention, the communications system may further include a centralized control node. The base station may request the resource configuration information of the MTC service from the centralized control node.

A tenth aspect of the embodiments of the present invention further provides a computer program, to enable a computer to execute the methods provided in the first aspect, the second aspect and the implementation manners of the first aspect and the second aspect.

The implementation manners of the first aspect, the second aspect, the third aspect, or the fourth aspect that are provided in the embodiments of the present invention can all be correspondingly applied to any one of the fifth aspect to the tenth aspect provided in the embodiments of the present invention.

In all aspects and all implementation manners provided in the embodiments of the present invention, the standard subframe may be a subframe in an LTE system, and the standard subframe may include 12 or 14 symbols.

In all aspects and all implementation manners provided in the embodiments of the present invention, the uplink MTC resource is located in a resource of the LTE system; and/or the downlink MTC resource is located in the resource of the LTE system.

BRIEF DESCRIPTION OF THE DRAWINGS

To describe the technical solutions in the embodiments of the present invention more clearly, the following briefly describes the accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

DETAILED DESCRIPTION OF ILLUSTRATIVE EMBODIMENTS

Figure 1:
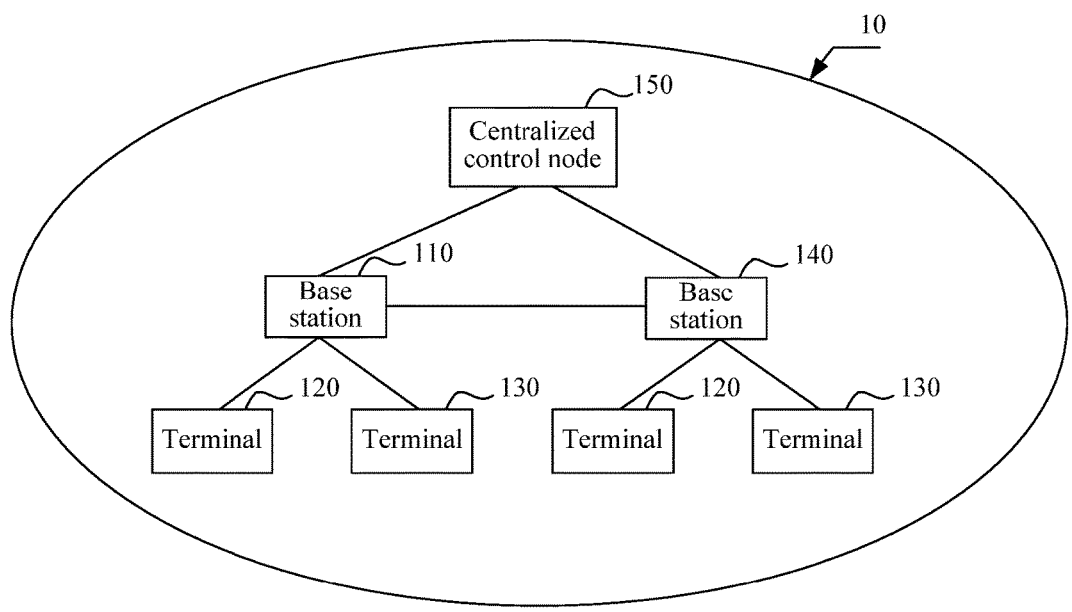
FIG. 1 is a schematic diagram of a communications system according to an embodiment of the present invention.

To make the specific technical solutions and objectives of the present invention clearer, the following provide a clear and complete description with reference to the specific implementation manners and the accompanying drawings. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

Technical solutions provided in the embodiments of the present invention can be applied to various wireless communications networks, for example, a code division multiple access (CDMA) network, a time division multiple access (TDMA) network, a frequency division multiple access (FDMA) network, an orthogonal frequency-division multiple access (OFDMA) network, a single carrier FDMA (SC-FDMA) network, and other networks. The terms "network" and "system" can be interchanged with each other. A CDMA network can implement wireless technologies such as universal terrestrial radio access (UTRA) and CDMA 2000. UTRA may include CDMA (WCDMA) and other variants of CDMA. CDMA 2000 may cover the interim standard (IS) 2000 (IS-2000), the IS-95 standard, and the IS-856 standard. A TDMA network can implement wireless technologies such as global system for mobile communications (GSM). An OFDMA network can implement wireless technologies such as evolved universal terrestrial radio access (E-UTRA), ultra mobile broadband (UMB), IEEE 802.11 (Wi-Fi), IEEE 802.16 (WiMAX), IEEE 802.20, and Flash OFDMA. UTRA and E-UTRA are UMTS and an evolved version of UMTS. 3GPP is a new version of UMTS using E-UTRA in long term evolution (LTE) and LTE Advanced (LTE-A). UTRA, E-UTRA, UMTS, LTE, LTE-A, and GSM are recorded and described in a document of the 3GPP standard organization. CDMA 2000 and UMB are recorded and described in a document of the 3GPP2 standard organization. The technologies described in the embodiments of the present invention can also be applied to the wireless networks and wireless technologies described above.

In the embodiments of the present invention, a frame structure that is not dedicated to an MTC application and that is specified in the standards is referred to as a standard frame structure or a normal frame structure. A subframe included in the standard frame structure is referred to as a standard subframe or a normal subframe. For example, a voice or data service is implemented by using a frame structure specified in an existing communications standard specification and a subframe specified in the existing communications standard specification, for example, a frame structure specified in a 3GPP GSM specification, a UMTS specification, an LTE specification, a 3GPP2 CDMA specification, or an IEEE specification. Generally, the standard frame structure specified in the standards can satisfy service needs, including a delay requirement, of a user such as voice and data. In a process that a terminal normally performs access and implements a service, a requirement of a user for a delay is not very high. Even if a standard delay (or referred to as a normal delay) produced by performing communication according to a standard frame structure and a standard subframe does not reach a level of milliseconds, a user can accept the standard delay if normal using is not affected. However, the standard delay cannot be applied to some MTC applications with higher delay requirements.

For example, in an LTE system, in a standard frame structure, a length of a radio frame is 10 milliseconds, and the radio frame includes ten standard subframes. A length of each standard subframe is one millisecond (ms), and the standard subframe includes 12 or 14 symbols. If UE needs to send uplink data, the UE sends an SR to a base station in a standard subframe. The base station needs 3 ms to demodulate the SR to obtain information in the SR. Then the base station sends a scheduling grant (SG) to the UE in a standard subframe. The UE needs 3 ms to demodulate the SG to obtain information in the SG, and then sends uplink data according to information allocated according to the SG. If the uplink data is sent in a standard subframe, a standard delay required by the UE in a process of sending the uplink data by using the standard subframe is at least 9 ms. For some MTC applications with high delay requirements, for example, a delay requirement in a smart grid is 3 ms, and a standard subframe cannot satisfy a need of a low delay.

As shown in FIG. 1, an embodiment of the present invention provides a communications system 10. The communications system 10 may include a base station 110 and a terminal 120. The terminal 120 may implement an MTC service by using an MTC subframe. In this embodiment of the present invention, the MTC service has a requirement for a short delay. The short delay is shorter than the standard delay. The MTC service is only a name expression of a service having a short-delay need and may include any short-delay service. The MTC service does not have any limitation to the service. The MTC subframe only refers to a limitation to a name of a subframe, does not limit a specific application scenario, and can be applied to all data transmission having a short-delay requirement. Therefore, the MTC service may also be referred to as a short-delay service, and the MTC subframe may also be referred to as a short subframe.

In this embodiment of the present invention, a quantity of symbols included in the MTC subframe is less than a quantity of symbols included in the standard subframe. The quantity of the symbols included in the MTC subframe may be configured according to a transmission delay required by the MTC service. Optionally, the quantity of the symbols included in the MTC subframe may be configured according to the required transmission delay and with reference to at least one of a scheduling delay or a processing delay. The quantity of the symbols included in the MTC subframe may be in direct proportion to the required transmission delay. The shorter required transmission delay indicates the smaller quantity of the symbols. For example, in an LTE system, a length of a standard subframe is 1 ms, and a quantity of symbols included in the standard subframe is 12 or 14. Therefore, the quantity of the symbols included in the MTC subframe in this embodiment of the present invention may be less than 14 or 12, for example, the quantity may be 2 or 3 or may be configured as 1 or another quantity less than 12 according to needs. In this embodiment of the present invention, MTC applications with different delay needs can be satisfied.

In this embodiment, the terminal 120 may support a short-delay service, may be referred to as a terminal supporting a short-delay service, or may be referred to as an MTC terminal. The terminal 120 may also perform data transmission by using a standard subframe. Therefore, the terminal 120 can compatibly implement a data transmission service with a standard delay or a longer delay.

In this embodiment of the present invention, the terminal 120 may be a mobile station, user equipment, a subscriber unit, a cellular phone, a smartphone, a wireless data card, a personal digital assistant (PDA) computer, a tablet computer, a wireless modem, a handheld device, a laptop computer, a cordless phone, or a wireless local loop (WLL) station. Alternatively, the terminal 120 may include a terminal device for performing communication between machines and an Internet of Things terminal having a wireless communication function, for example, a phasor measurement unit (PMU) and an advanced meter infrastructure (AMI).

The base station 110 in this embodiment of the present invention may be a macro base station or may be an access network device such as a small cell. Transmit power and coverage of the small cell are both less than those of the macro base station. For example, the small cell may be a home evolved NodeB (HeNodeB), a micro base station, an access point (AP), and a pico base station.

As shown in FIG. 1, optionally, the communications system 10 may further include a terminal 130 not supporting an MTC service. The terminal 130 not supporting a short-delay service may be referred to as a non-MTC terminal. The non-MTC terminal may perform communication by using a standard subframe. Therefore, the terminal 130 may also be referred to as a standard terminal or a conventional terminal. In this embodiment of the present invention, the base station 110 may perform communication with an MTC terminal 120 by using an MTC subframe, and may also perform communication with the non-MTC terminal 130 not supporting an MTC service by using a standard subframe. Optionally, when performing communication with the terminal 120 supporting a short-delay service by using an MTC subframe and performing communication with the terminal 130 not supporting a short-delay service by using a standard subframe, the base station 110 may use a same frequency band.

As shown in FIG. 1, the communications system 10 may also include a base station 140. The base station 110 and the base station 140 may be both macro base stations or both small cells, or one of the base station 110 and the base station 140 is a macro base station, and the other one is a small cell. The base station 140 may also perform communication with the MTC terminal 120 by using an MTC subframe, and may also perform communication with the non-MTC terminal 130 by using a standard subframe. The communications system 10 may further include a centralized control node 150, for example, a single access network controller (SRC). The base station 110 and the base station 140 can be both controlled by the centralized control node.

Figure 2:
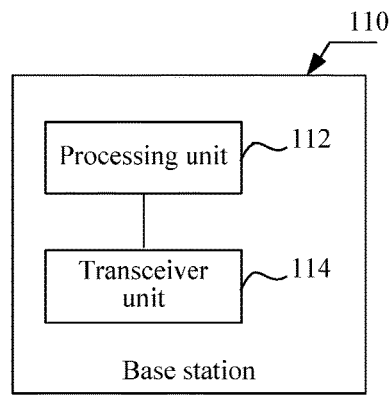
FIG. 2 is a schematic structural diagram of a base station according to an embodiment of the present invention.
Figure 3:
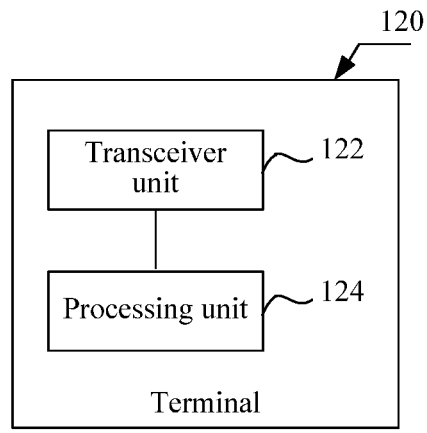
FIG. 3 is a schematic structural diagram of a terminal according to an embodiment of the present invention.

As shown in FIG. 2, FIG. 2 shows a base station 110 according to an embodiment of the present invention. The base station 110 may include a processing unit 112 and a transceiver unit 114. As shown in FIG. 3, FIG. 3 shows a terminal 120 according to an embodiment of the present invention. The terminal 120 may include a transceiver unit 122 and a processing unit 124. In this embodiment of the present invention, because the processing unit 112 and the transceiver unit 114 are included in the base station 110, and the processing unit 124 and the transceiver unit 122 are included in the terminal 120, operations executed by the processing unit 112 or the transceiver unit 114 can all be considered as operations of the base station 110, and operations executed by the processing unit 124 or the transceiver unit 122 can all be considered as operations of the terminal 120. In this embodiment of the present invention, the processing unit 112 in the base station 110 may be implemented by a processor of the base station 110, and the transceiver unit 114 may be implemented by a transceiver of the base station 110. The processing unit 124 in the terminal 120 may be implemented by a processor of the terminal 120, and the transceiver unit 122 may be implemented by a transceiver of the terminal 120.

Figure 4:
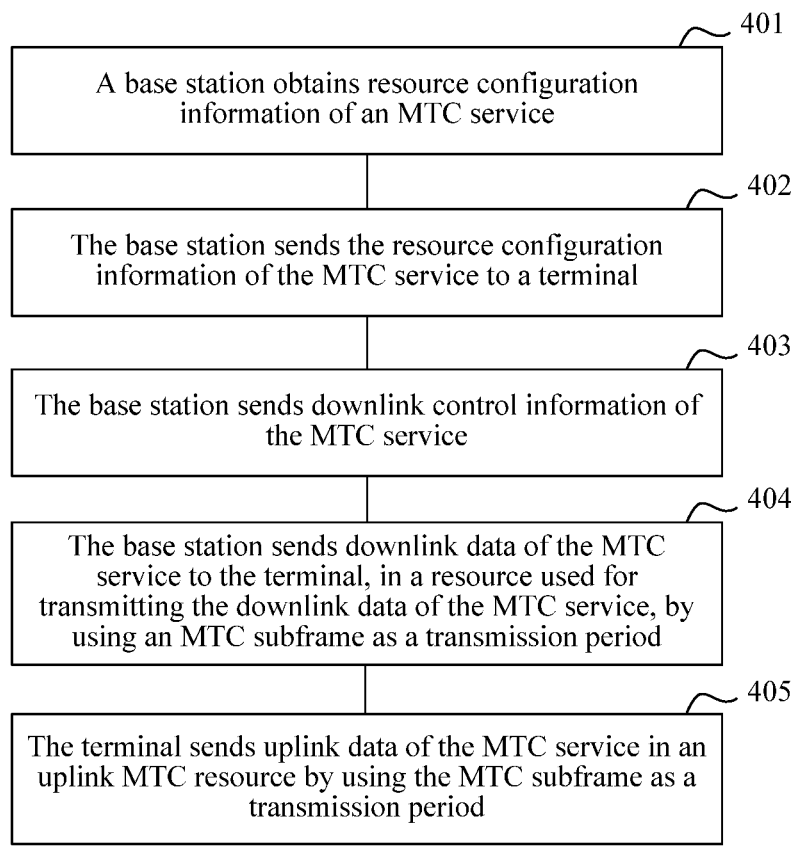
FIG. 4 is a schematic flowchart of a communication method according to an embodiment of the present invention.

As shown in FIG. 4, FIG. 4 shows a communication method according to an embodiment of the present invention, to implement an MTC service. The method can be applied to the communications system 10. The method provided in this embodiment can be implemented by the base station 110 shown in FIG. 2 and the terminal 120 shown in FIG. 3. The communication method may first include a resource configuration method, including the following steps.

Step 401: The base station 110 obtains resource configuration information of an MTC service.

The resource configuration information of the MTC service includes at least one of information about an uplink MTC resource and information about a downlink MTC resource, namely, information indicating an uplink resource used for the MTC service and/or information indicating a downlink resource used for the MTC service. The uplink resource used for the MTC service refers to an uplink resource that can be used for the MTC service, and the downlink resource used for the MTC service refers to a downlink resource that can be used for the MTC service. Therefore, the uplink MTC resource can also be understood as an available uplink MTC resource, and the downlink MTC resource can be understood as an available downlink MTC resource. Optionally, the processing unit 112 in the base station 110 may be configured to obtain resource configuration information of the MTC service. The resource configuration information of the MTC service may further include configuration information of an MTC subframe. The configuration information of the MTC subframe includes a quantity of symbols included in the MTC subframe. If the base station 110 is a macro base station, the base station 110 may independently configure the uplink MTC resource and/or the downlink MTC resource. The base station 110 may configure the quantity of the symbols in the MTC subframe according to a transmission delay of the MTC service, or may configure the quantity of the symbols in the MTC subframe according to the transmission delay, and at least one of a scheduling delay or a processing delay. Alternatively, the base station 110 may request the resource configuration information of the MTC service from the centralized control node 150. The resource configuration information of the MTC service is configured by the centralized control node 150 and then is sent to the base station 110. If the base station 110 is a small cell, the base station 110 may request the resource configuration information of the MTC service from a macro base station connected to the small cell or the centralized control node 150. The resource configuration information of the MTC service is configured by the centralized control node 150 or the macro base station and then is sent to the base station 110.

When knowing that a terminal in coverage of the base station 110 has an MTC service requirement, the base station 110 configures the resource configuration information of the MTC service or requests the resource configuration information of the MTC service.

When the MTC service needs different transmission delay requirements, the base station 110 may configure the quantity of the symbols in the MTC subframe according to different transmission delays, to adapt to different application scenarios of the MTC service. Alternatively, for a same MTC terminal, update may be performed according to different requirements of the MTC terminal for a transmission delay at different times, to obtain the resource configuration information of the MTC subframe.

Step 402: The base station 110 sends the resource configuration information of the MTC service to a terminal 120.

Optionally, the transceiver unit 114 in the base station 110 may be configured to send the resource configuration information of the MTC service to the terminal 120.

The terminal 120 receives the resource configuration information of the MTC service that is sent by the base station 110. Optionally, the transceiver unit 122 in the terminal 120 may be configured to receive the resource configuration information of the MTC service that is sent by the base station 110. The processing unit 124 in the terminal 120 obtains the information about the uplink MTC resource and/or the information about the downlink MTC resource according to the resource configuration information of the MTC service, to obtain the uplink resource and/or the downlink resource used for the MTC service.

Step 403: The base station 110 sends downlink control information (DCI) of the MTC service to the terminal 120.

The downlink control information indicates information about a resource used for transmitting downlink data of the MTC service, and/or indicates information about a resource used for transmitting uplink data of the MTC service. The resource used for transmitting the downlink data of the MTC service is located in the downlink MTC resource. A time domain resource in the resource used for transmitting the downlink data of the MTC service may be less than or equal to a time domain resource of the downlink MTC resource. A frequency domain resource in the resource used for transmitting the downlink data of the MTC service may be less than or equal to a frequency domain resource in the downlink MTC resource. The resource used for transmitting the uplink data of the MTC service is located in the uplink MTC resource. A time domain resource in the resource used for transmitting the uplink data of the MTC service may be less than or equal to a time domain resource of the uplink MTC resource. A frequency domain resource in the resource used for transmitting the uplink data of the MTC service may be less than or equal to a frequency domain resource in the uplink MTC resource. The resource used for transmitting the uplink data of the MTC service and/or the resource used for transmitting the downlink data of the MTC service refers to a resource of the MTC service used between the base station 110 and the terminal 120.

Optionally, the transceiver unit 114 in the base station 110 may be configured to send the downlink control information of the MTC service to the terminal 120.

Figure 5:
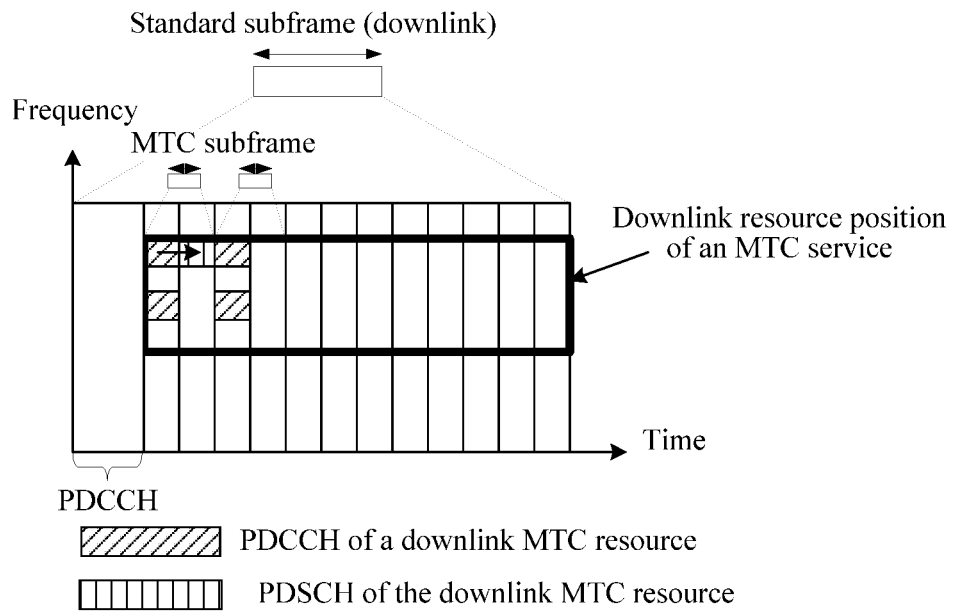
FIG. 5 is a schematic diagram of a physical downlink control channel sending an MTC service according to an embodiment of the present invention.

The base station 110 may send the downlink control information of the MTC service to the MTC terminal on a physical downlink control channel (PDCCH) of the downlink MTC resource by using the MTC subframe as a transmission period. In this embodiment of the present invention, sending by using the MTC subframe as a transmission period refers to sending by using the MTC subframe as a unit, that is, sending information on a corresponding frequency resource in the MTC subframe. As shown in FIG. 5, the base station 110 may send the downlink control information of the MTC service to the terminal 120 on the PDCCH of the downlink MTC resource and in an MTC subframe including two symbols. The resource used for transmitting the downlink data of the MTC service may be, for example, a physical downlink shared channel (PDSCH) of the downlink MTC resource or any channel resource sending the downlink data. The resource used for transmitting the uplink data of the MTC service may be, for example, a physical uplink shared channel (PUSCH) of the uplink MTC resource or any channel resource sending the uplink data.

Alternatively, the base station 110 may send the downlink control information of the MTC service to the MTC terminal on a PDCCH of the standard subframe.

If in steps 401 and 402, the base station 110 does not send the quantity of the symbols included in the MTC subframe to the terminal 120 in the resource configuration information of the MTC service, the downlink control information may include the quantity of the symbols included in the MTC subframe.

The terminal 120 receives the downlink control information of the MTC service that is sent by the base station 110 in the downlink MTC resource by using the MTC subframe as a transmission period, or receives the downlink control information of the MTC service that is sent by the base station 110 on the PDCCH of the standard subframe. After the terminal 120 obtains, by using the resource configuration information of the MTC service, the uplink MTC resource and/or the downlink MTC resource that can be used for the MTC service, the terminal 120 may determine, according to the downlink control information of the MTC service, the resource used for transmitting the uplink data of the MTC service and/or the resource used for transmitting the downlink data of the MTC service that is allocated to the terminal 120. For example, the resource used for transmitting the uplink data of the MTC service and/or the resource used for transmitting the downlink data of the MTC service that is about to be used may be determined by demodulating the PDCCH of the downlink MTC resource or the PDCCH of the standard subframe. Optionally, the transceiver unit 122 in the terminal 120 may receive the downlink control information of the MTC service that is sent by the base station 110 in the downlink MTC resource or receive the downlink control information of the MTC service that is sent by the base station 110 on the PDCCH of the standard subframe. The processing unit 124 in the terminal 120 may be configured to obtain the resource used for transmitting the downlink data of the MTC service and/or the resource used for transmitting the uplink data of the MTC service according to the downlink control information of the MTC service.

In all embodiments of the present invention, the resource that is used for the MTC service and that is configured for the terminal 120 by the base station 110 includes the uplink MTC resource or the downlink MTC resource and may be some or all of existing resources (including time resources and frequency resources) in the communications system. That is, the resource used for the MTC service may be located in the existing resources in the communications system, and the resource used for the MTC service is some or all of the existing resources in the communications system. Alternatively, that is, the resource used for the MTC service may be an existing resource in a legacy communications system. The communications system may be a GSM system, a UMTS system, an LTE system, or a CDMA related system. The existing resources in the communications system refer to resources determined according to an existing communications specification, for example, time frequency resources specified according to a 3GPP GSM specification, a UMTS specification, an LTE specification, a 3GPP2

CDMA specification, or an IEEE specification. For example, a time domain resource of the existing time frequency resources of the communications system is a standard subframe, and a frequency domain resource is f MHz. The resource of the MTC service may be located in the time frequency resource, and a time domain resource of the resource of the MTC service may be less than or equal to a length of the standard subframe. A frequency domain resource of the resource of the MTC service may be less than or equal to f MHz.

According to the foregoing resource configuration method, the terminal 120 may obtain the uplink MTC resource. In this way, when the terminal 120 needs to transmit the uplink data of the MTC service, the terminal 120 may send data on the uplink MTC resource according to scheduling of the base station 110. The terminal 120 may further obtain the information about the downlink MTC resource and/or the information about the uplink MTC resource, and obtain the downlink control information of the MTC service from the downlink MTC resource determined according to the information about the downlink MTC resource, or obtain the downlink control information of the MTC service from the PDCCH of the standard subframe, so as to determine the resource used for transmitting the downlink data of the MTC service and/or the resource used for transmitting the uplink data of the MTC service. In this way, the downlink data of the MTC service delivered by the base station 110 may be received, and/or the uplink data of the MTC service may be sent to the base station 110. Because the quantity of the symbols of the MTC subframe is determined according to a delay of the MTC service and is less than the quantity of the symbols of the standard subframe, it can be ensured that a transmission delay requirement of the MTC service is satisfied.

Optionally, the base station 110 may further transmit a short-delay service with the terminal 120. The MTC service communication method further includes the following step 404 and/or step 405:

Step 404: The base station 110 sends downlink data of the MTC service to the terminal 120, in a resource used for transmitting the downlink data of the MTC service, by using an MTC subframe as a transmission period.

Optionally, the transceiver unit 114 in the base station 110 may send the downlink data to the terminal 120, in the resource used for transmitting the downlink data of the MTC service, by using the MTC subframe as a transmission period, for example, send the downlink data in a PDSCH of the MTC resource by using the MTC subframe as a transmission period.

The terminal 120 may receive, in the resource used for transmitting the downlink data of the MTC service, the downlink data sent by the base station 110. Optionally, the transceiver unit 122 in the terminal 120 receives, in the resource used for transmitting the downlink data of the MTC service, the downlink data sent by the base station 110.

Step 405: The terminal 120 sends uplink data of the MTC service in the uplink MTC resource by using the MTC subframe as a transmission period. Alternatively, the terminal 120 may send uplink data of the MTC service, in the resource used for transmitting the uplink data of the MTC service, by using the MTC subframe as a transmission period.

Optionally, the transceiver unit 122 in the terminal 120 may be configured to send the uplink data of the MTC service, in the uplink MTC resource or in the resource used for transmitting the uplink data of the MTC service, by using the MTC subframe as a transmission period. The terminal 120 may send the uplink data of the MTC service in the uplink MTC resource or in the resource used for transmitting the uplink data of the MTC service according to scheduling of the base station 110.

The base station 110 may receive, in the uplink MTC resource or in the resource used for transmitting the uplink data of the MTC service, the uplink data sent by the terminal 120. Optionally, the transceiver unit 114 in the base station 110 may be configured to receive, in the uplink MTC resource or in the resource used for transmitting the uplink data of the MTC service, the uplink data sent by the terminal 120.

When both step 404 and step 405 are included, there is no special limitation to a sequence between step 404 and step 405.

Figure 4B:
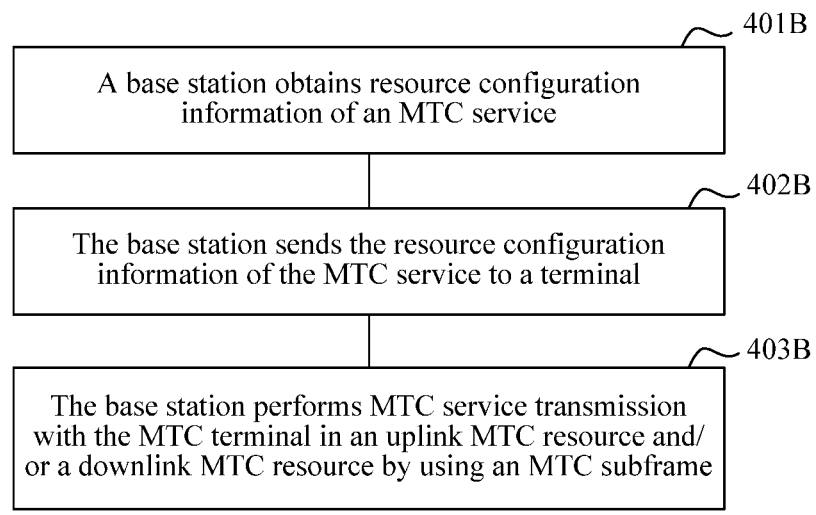
FIG. 4B is a schematic flowchart of a communication method according to an embodiment of the present invention.

As shown in FIG. 4B, FIG. 4B shows another communication method according to an embodiment of the present invention, to implement an MTC service. The method can be applied to the communications system 10. The method provided in this embodiment can be implemented by the base station 110 shown in FIG. 2 and the terminal 120 shown in FIG. 3. The communication method includes: Step 401B: The base station 110 obtains resource configuration information of an MTC service. The resource configuration information of the MTC service includes at least one of information about an uplink MTC resource or information about a downlink resource. That is, the resource configuration information of the MTC service includes the information about the uplink MTC resource, the resource configuration information of the MTC service includes the information about the downlink MTC resource, or the resource configuration information of the MTC service includes the information about the uplink MTC resource and the information about the downlink MTC resource.

Step 402B: The base station 110 sends the resource configuration information of the MTC service to a terminal 120.

For content in step 401B and step 402B, respectively refer to descriptions of step 401 and step 402 in the embodiment shown in FIG. 4.

Step 403B: The base station 110 performs MTC service transmission with the MTC terminal by using an MTC subframe in the uplink MTC resource and/or the downlink MTC resource.

Optionally, the transceiver unit in the base station 110 and the transceiver unit 122 in the terminal 120 perform MTC service transmission by using an MTC subframe in the uplink MTC resource and/or the downlink MTC resource.

The base station 110 may transmit the uplink data of the MTC service by using an MTC subframe in the uplink MTC resource, transmit the downlink data of the MTC service by using an MTC subframe in the downlink MTC resource, or transmit the uplink data of the MTC service and the downlink data of the MTC service by using an MTC subframe in the uplink MTC resource and the downlink MTC resource.

In this embodiment of the present invention, an MTC subframe is used to perform MTC service transmission, that is, MTC service transmission is performed by using the MTC subframe as a transmission period, that is, the MTC service is transmitted by using an MTC subframe as granularity.

In this embodiment, that the base station 110 performs MTC service transmission with the MTC terminal by using an MTC subframe in the uplink MTC resource and/or the downlink MTC resource may include content in step 403 of the embodiment shown in FIG. 4. That is, the base station 110 may send the downlink control information of the MTC service to the terminal 120, and the terminal 120 may determine the information about the resource used for transmitting the downlink data of the MTC service according to the downlink control information of the MTC service, and/or indicate the information about the resource used for transmitting the uplink data of the MTC service. Further, the base station 110 may execute content in the foregoing step 404 and step 405. The base station 110 performs MTC service transmission with the MTC terminal in the resource used for transmitting the downlink data of the MTC service and/or the resource used for transmitting the uplink data of the MTC service.

Optionally, that the base station 110 performs MTC service transmission with the MTC terminal by using an MTC subframe in the uplink MTC resource and/or the downlink MTC resource may include:

The base station 110 sends a spreading code used for MTC service uplink transmission and/or a spreading code used for MTC service downlink transmission to the terminal 120. The terminal 120 sends the uplink data of the MTC service to the base station according to the spreading code used for MTC service uplink transmission and in the uplink MTC resource by using the MTC subframe as a transmission period; and/or the terminal 120 receives, according to the spreading code used for MTC service downlink transmission and in the downlink MTC resource by using the MTC subframe as a transmission period, the downlink data of the MTC service that is sent by the base station 110.

The transceiver unit 122 in the terminal 120 may be configured to send the uplink data of the MTC service to the base station according to the spreading code used for MTC service uplink transmission and in the uplink MTC resource by using the MTC subframe as a transmission period. Alternatively, the transceiver unit 122 in the terminal 120 may be configured to receive, by using the spreading code used for MTC service downlink transmission and in the downlink MTC resource by using the MTC subframe as a transmission period, the downlink data of the MTC service that is sent by the base station 110. The terminal 120 may send the uplink data of the MTC service in the uplink MTC resource according to scheduling of the base station 110.

The transceiver unit 114 in the base station 110 may be configured to receive, according to the spreading code used for MTC service uplink transmission and in the uplink MTC resource by using the MTC subframe as a transmission period, the uplink data of the MTC service that is sent by the terminal 120, or may be configured to send the downlink data of the MTC service to the terminal 120 according to the spreading code used for MTC service downlink transmission and in the downlink MTC resource by using the MTC subframe as a transmission period.

When multiple terminals 120 exist, by being distinguished by spreading codes, the multiple terminals 120 may transmit the MTC service by using a same frequency.

In this embodiment of the present invention, implementing the MTC service by using the MTC subframe may satisfy MTC applications with different short-delay requirements. The MTC service can be completely implemented based on compatibility with an existing communications specification by sending the resource configuration information and the downlink control information of the MTC service. The MTC service can be implemented without improvement to the system, saving costs.

In this embodiment of the present invention, the base station 110 may transmit the resource configuration information of the MTC service to the terminal 120 by using a physical downlink control channel (PDCCH) in the standard subframe, may transmit the resource configuration information of the MTC service to the terminal 120 by using an enhanced PDCCH (ePDCCH) in the standard subframe, may transmit the resource configuration information of the MTC service to the terminal 120 by using broadcast information, or may transmit the resource configuration information of the MTC service to the terminal 120 by using radio resource control (RRC) signaling or Media Access Control (MAC) signaling. For a same terminal, the base station 110 may send the resource configuration information of the MTC service that can satisfy different transmission delay requirements to the terminal in the foregoing same manner, or may send the resource configuration information of the MTC service to the terminal in the foregoing different manners. The base station 110 may also send the resource configuration information of the MTC service to different terminals in the foregoing same manner. The base station 110 may also send resource configuration information of different MTC services to different terminals in the foregoing different manners.

Figure 6:
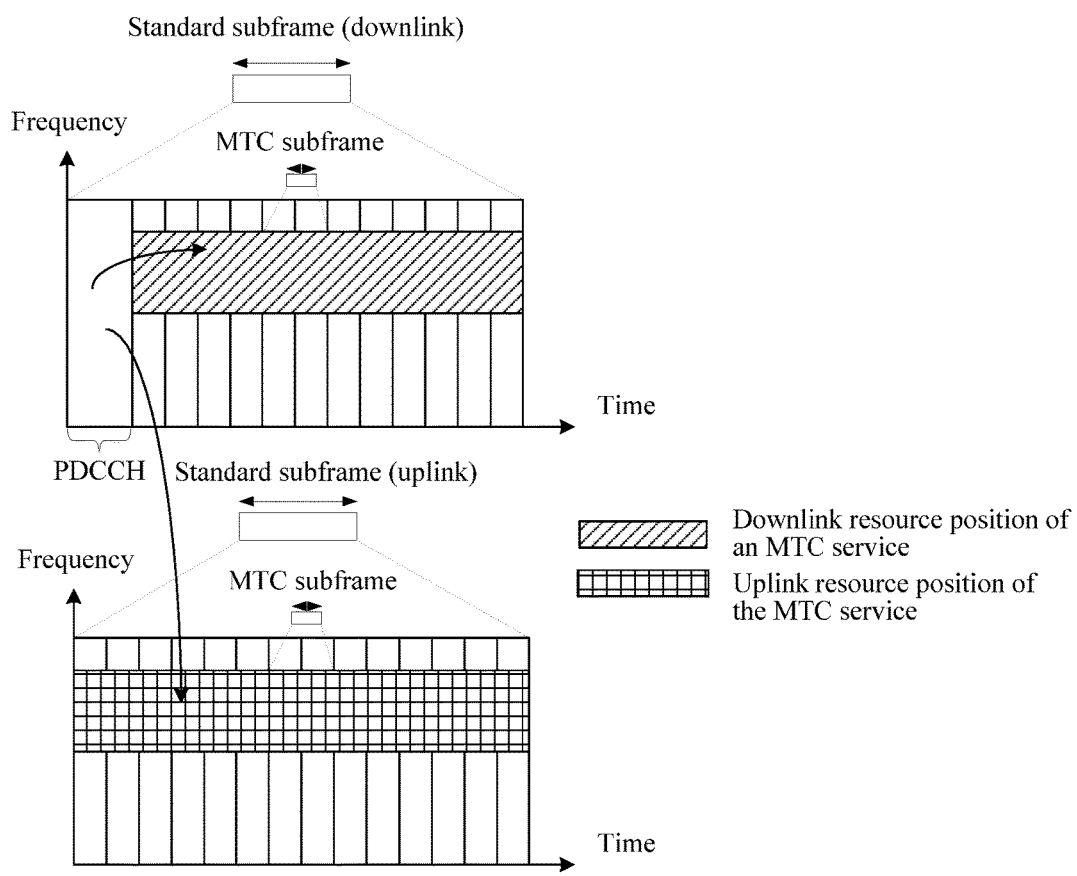
FIG. 6 is a schematic diagram of sending resource configuration information of an MTC service according to an embodiment of the present invention.
Figure 7:
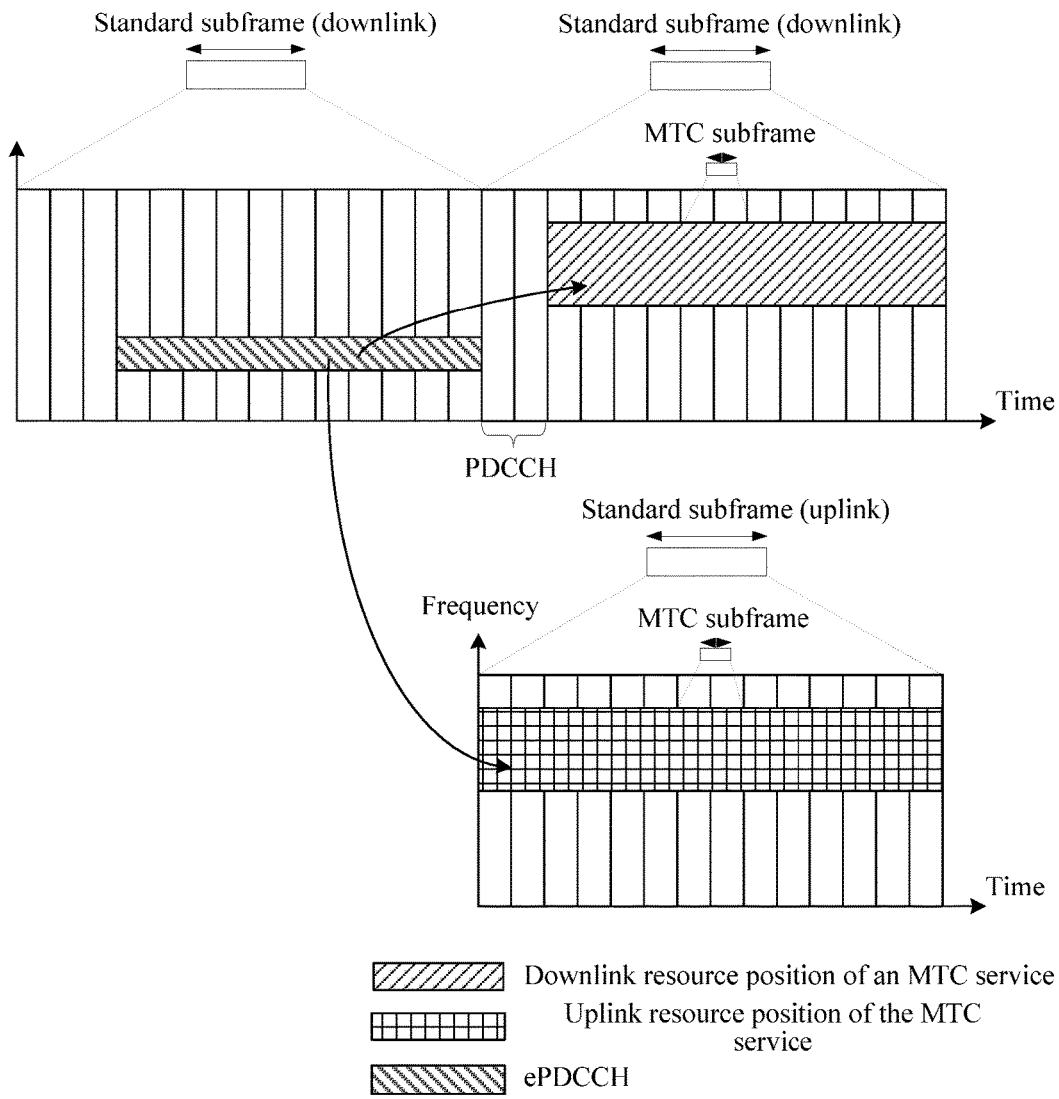
FIG. 7 is a schematic diagram of sending resource configuration information of an MTC service according to an embodiment of the present invention.

In the manner in which the base station 110 sends the resource configuration information of the MTC subframe to the terminal by using the PDCCH or the ePDCCH in the standard subframe, when the terminal 120 is connected to a network, the base station 110 allocates to the terminal 120 a particular RNTI, which may be a first RNTI or is referred to as an L-RNTI. The L is a symbol used to distinguish the particular RNTI, and is not limited. The base station 110 sends the first RNTI to the terminal 120. As shown in FIG. 6, the base station 110 may send the downlink control information to the terminal 120 on the PDCCH, and the downlink control information includes the resource configuration information of the MTC service. Alternatively, as shown in FIG. 7, the base station 110 may send the downlink control information to the terminal 120 on the ePDCCH. The terminal 120 receives the first RNTI, and demodulates the downlink control information according to the first RNTI, to obtain the resource configuration information of the MTC service, so as to obtain the information about the uplink MTC resource and/or the information about the downlink MTC resource. The base station 110 may send the resource configuration information of the MTC subframe in time and flexibly to the terminal by using the PDCCH and the ePDCCH in the standard subframe, and may quickly adjust the resource configuration information of the MTC subframe according to a delay requirement. The transceiver unit 114 in the base station 110 may be configured to send the first RNTI and the downlink control information to the terminal 120. The transceiver unit 122 in the terminal 120 may be configured to receive the first RNTI and the downlink control information that are sent by the base station 110. The processing unit 124 may be configured to demodulate the downlink control information according to the first RNTI, to obtain the configuration information of the MTC subframe.

In the embodiment shown in FIG. 6 or FIG. 7, the downlink resource of the MTC service or the uplink resource of the MTC service indicated by using the resource configuration information is located in a resource of the standard subframe (including a frequency domain and a time domain). The frequency domain occupies a portion of the resource, and the time domain occupies all of the resource. FIG. 6 and FIG. 7, as an embodiment of the present invention, are not limited to what is shown in FIG. 6 and FIG. 7. For example, in the embodiment shown in FIG. 6 or FIG. 7, a frequency resource of the indicated downlink resource of the MTC service or uplink resource of the MTC service may also occupy all of a frequency resource occupied by the standard subframe, or a time domain resource of the indicated downlink resource of the MTC service or uplink resource of the MTC service may also occupy a portion of the resource of the standard subframe.

In the manner in which base station 110 transmits the resource configuration information of the MTC service to the terminal 120 by using broadcast information, the base station 110 sends the resource configuration information of the MTC service to the terminal 120 by using a broadcast message. The terminal 120 obtains the information about the uplink MTC resource and/or the information about the downlink MTC resource according to the received broadcast message. The transceiver unit 114 in the base station 110 may be configured to send the resource configuration information of the MTC service to the terminal 120 by using a broadcast message. The transceiver unit 122 in the terminal 120 may be configured to receive the resource configuration information of the MTC service that is sent by the base station 110 by using the broadcast message. Sending the resource configuration information of the MTC service by using a broadcast message may reduce signaling overheads of the system.

In the manner in which the base station 110 transmits the resource configuration information of the MTC service to the terminal 120 by using RRC signaling or MAC signaling, the base station 110 sends the resource configuration information of the MTC service to the terminal 120 by sending RRC signaling or MAC signaling. The terminal 120 obtains the resource configuration information of the MTC service according to the received RRC signaling or MAC signaling. The RRC signaling may be, for example, an RRC reconfiguration message. The transceiver unit 114 in the base station 110 may be configured to send the resource configuration information of the MTC service to the terminal 120 by using RRC signaling or MAC signaling. The transceiver unit 122 in the terminal 120 may be configured to receive the resource configuration information of the MTC service that is sent by the base station 110 by using RRC signaling or MAC signaling. Sending the resource configuration information of the MTC service by using RRC signaling or MAC signaling may reduce signaling overheads of the system.

In the manner in which the base station 110 transmits the resource configuration information of the MTC service to the terminal 120 by using RRC signaling or MAC signaling, the RRC signaling or the MAC signaling may further include a period and duration of the uplink MTC resource. In the embodiment shown in FIG. 4B, that the base station 110 performs MTC service transmission with the MTC terminal by using an MTC subframe in the uplink MTC resource and/or the downlink MTC resource may include:

The terminal 120 receives, according to a period and duration of the downlink MTC resource and in the downlink MTC resource by using the MTC subframe as a transmission period, the downlink data of the MTC service that is sent by the base station 110; and/or the terminal 120 sends the uplink data of the MTC service to the base station 110 according to the period and the duration of the uplink MTC resource and in the uplink MTC resource by using the MTC subframe as a transmission period.

The transceiver unit 122 in the terminal 120 may be configured to: receive, according to a period and duration of the downlink MTC resource and in the downlink MTC resource by using the MTC subframe as a transmission period, the downlink data of the MTC service that is sent by the base station 110; and/or send the uplink data of the MTC service to the base station 110 according to the period and the duration of the uplink MTC resource and in the uplink MTC resource by using the MTC subframe as a transmission period.

The transceiver unit 114 in the base station 110 may be configured to: send the downlink data of the MTC service to the terminal 120 according to the period and the duration of the downlink MTC resource and in the downlink MTC resource by using the MTC subframe as a transmission period; and/or receive, according to the period and the duration of the uplink MTC resource and in the uplink MTC resource by using the MTC subframe as a transmission period, the uplink data of the MTC service that is sent by the terminal 120. Sending a position, the period, and the duration of the uplink MTC resource to the terminal 120 directly by using RRC signaling or MAC signaling or sending information about a position, the period, and the duration of the downlink MTC resource may improve flexibility of configuration of the uplink MTC resource or the downlink MTC resource and improve MTC service transmission efficiency.

Figure 8:
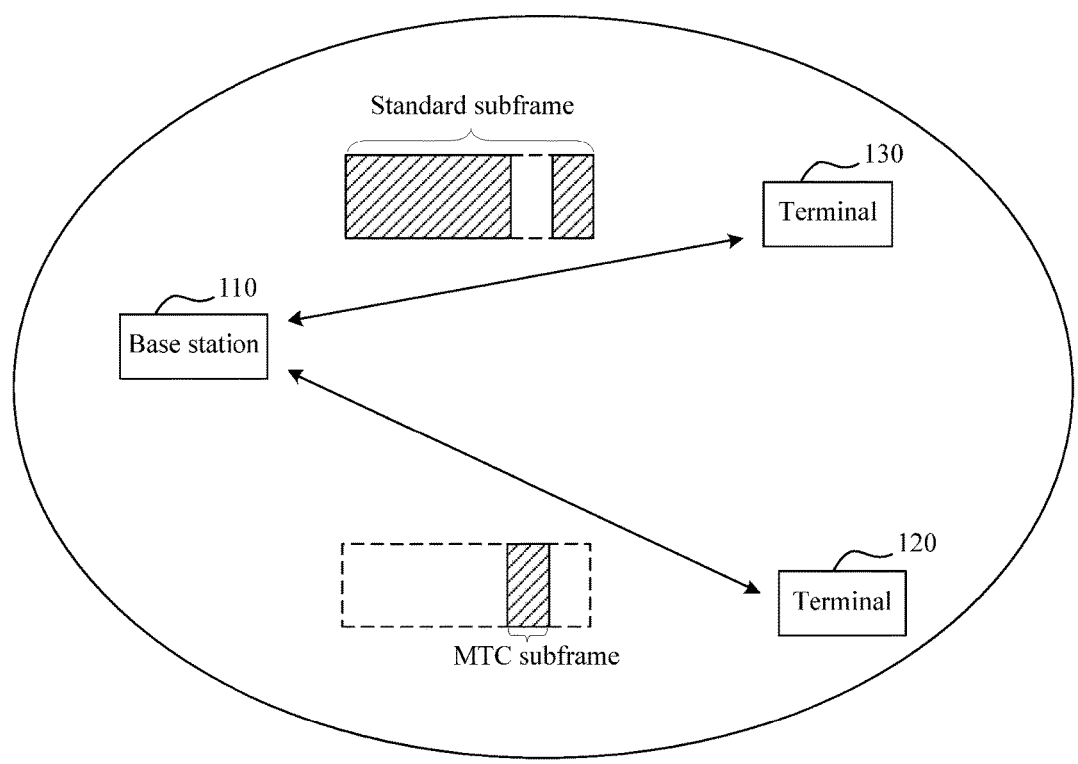
FIG. 8 is a schematic diagram of a communication method according to an embodiment of the present invention.

In the embodiment provided in FIG. 4 or FIG. 4B, when the base station 110 is a macro base station, the base station 110 may further perform communication with a non-MTC terminal. As shown in FIG. 8, the base station 110 performs communication with the terminal 130 by using the standard subframe, that is, performs communication with the non-MTC terminal. The base station 110 performs communication with the terminal 120 by using the MTC subframe. The base station 110 performs communication with the terminal 120 and the standard terminal 130 on a same frequency band. As shown in FIG. 8, when the base station 110 performs communication with the terminal 120 by using the MTC subframe and a particular frequency resource, the base station 110 performs communication with the standard terminal 130 without using the particular frequency resource within a period corresponding to the MTC subframe. In this way, a short-delay service of the terminal 120 can be implemented, and the standard terminal 130 and the terminal 120 can share a same frequency band resource, implementing maximum using of system resources.

Figure 9:
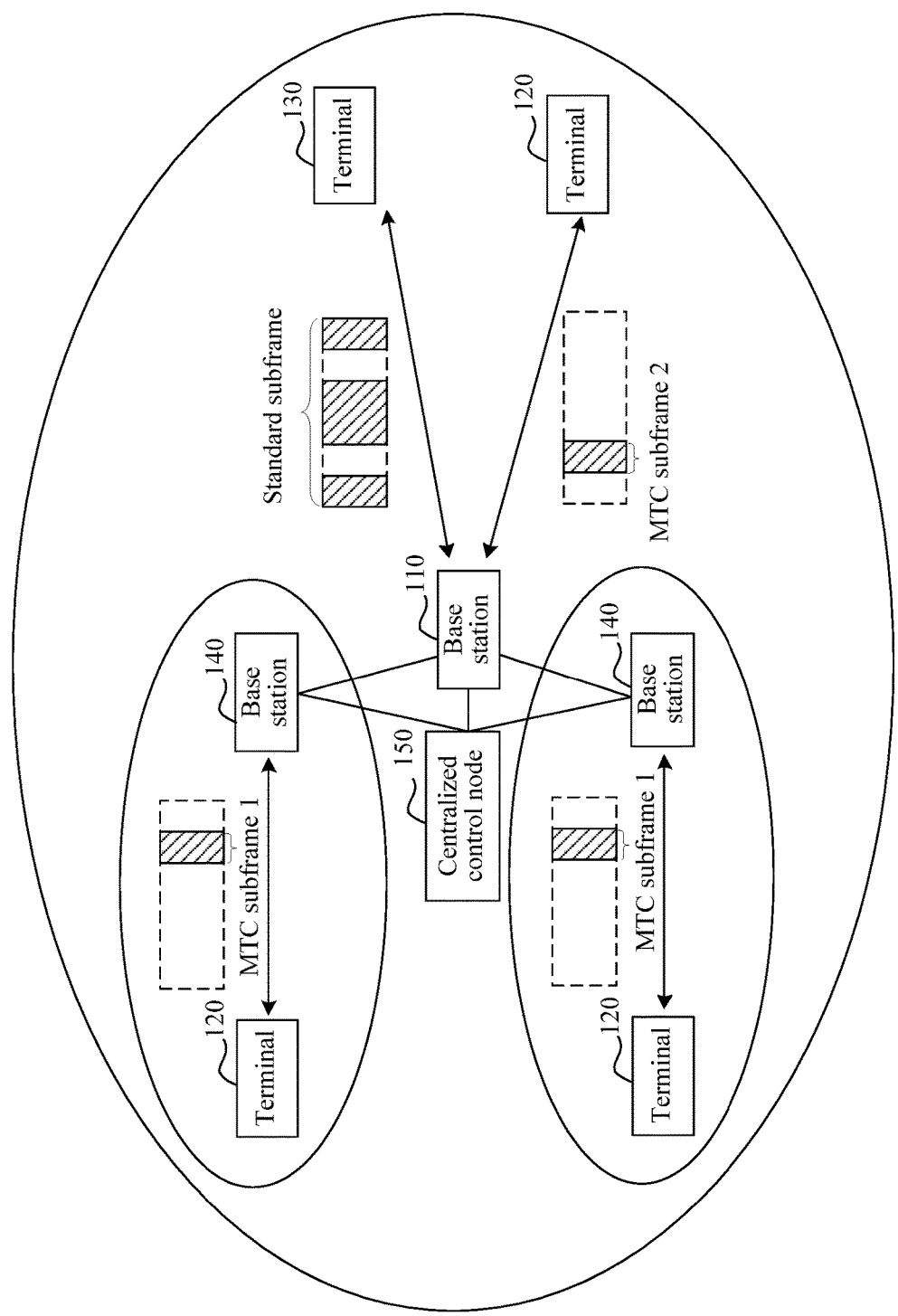
FIG. 9 is a schematic diagram of a communication method according to an embodiment of the present invention.

In the embodiment provided in FIG. 4 or FIG. 4B, when the base station 110 is a macro base station, the base station 110 performs communication with the non-MTC terminal 130 by using the standard subframe. The base station 110 performs communication with the terminal 120 by using the MTC subframe. The communications system 10 further includes at least one base station 140. The base station 140 is a small cell. The terminal 120 in coverage of the base station 140 is an MTC terminal. The base station 140 may request the resource configuration information of the MTC service from the base station 110 or the centralized control node 150. The base station 110 or the centralized control node 150 may perform configuration and transmission to the base station 140 according to the foregoing method provided in this embodiment of the present invention. The base station 140 may perform, by using the MTC subframe, communication with the terminal 120 in coverage of the base station 140. As shown in FIG. 9, the base station 140 may perform communication with the terminal 120 in coverage of the base station 140 in an MTC subframe 1. The base station 110 performs communication with the terminal 120 by using an MTC subframe 2. When the base station 110 performs communication with the terminal 130, a frequency used by the base station 140 in the MTC subframe 1 and a frequency used by the base station 110 in the MTC subframe 2 are not used within times corresponding to the MTC subframe 1 and the MTC subframe 2. When multiple base stations 140 whose coverage does not overlap exist, the multiple base stations 140 may perform, by using a same frequency resource, communication with terminals 120 in respective coverage of the base stations 140. In this way, MTC services of multiple MTC terminals can be implemented, and interference between MTC terminals and non-MTC terminals can be avoided.

Figure 10:
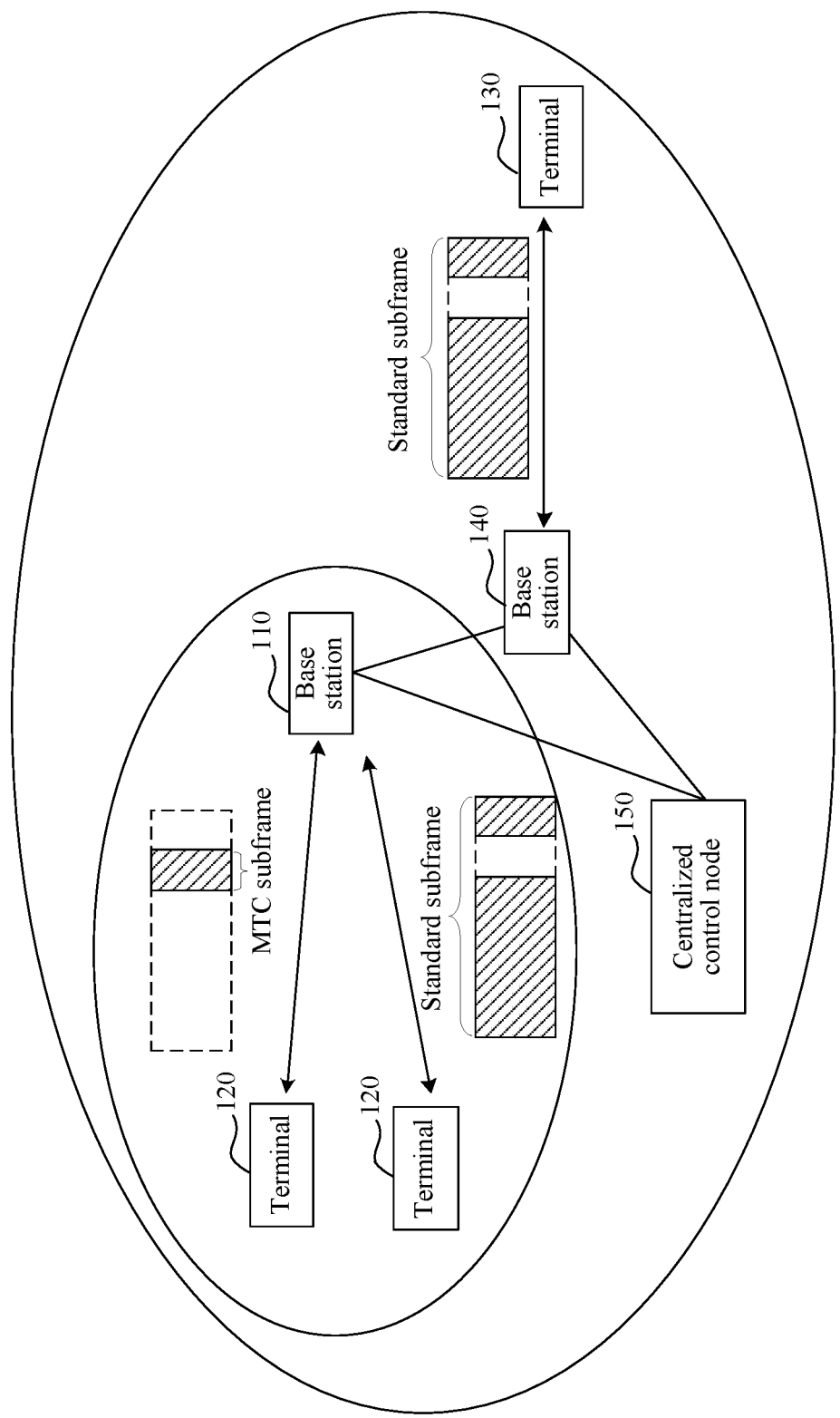
FIG. 10 is a schematic diagram of a communication method according to an embodiment of the present invention.

In the embodiment provided in FIG. 4 or FIG. 4B, when the base station 110 is a small cell, as shown in FIG. 10, the communications system further includes a base station 140. The base station 140 is a macro base station. The base station 110 may request the resource configuration information of the MTC service from the base station 140 or the centralized control node 150. The base station 140 or the centralized control node 150 may perform configuration and transmission to the base station 110 according to the foregoing method provided in this embodiment of the present invention. The base station 110 performs communication with the non-MTC terminal 130 by using the standard subframe and performs communication with the terminal 120 by using the MTC subframe. The base station 110 performs communication with the terminal 120 and the standard terminal 130 on a same frequency band. The base station 140 may perform communication with the non-MTC terminal 130 by using the standard subframe. A frequency resource used by the base station 110 for the MTC service is not used when the base station 140 performs communication with the non-MTC terminal 130. A frequency resource used by the base station 110 for a non-MTC service is the same as a frequency resource used by the base station 140 for a non-MTC service.

Figure 11:
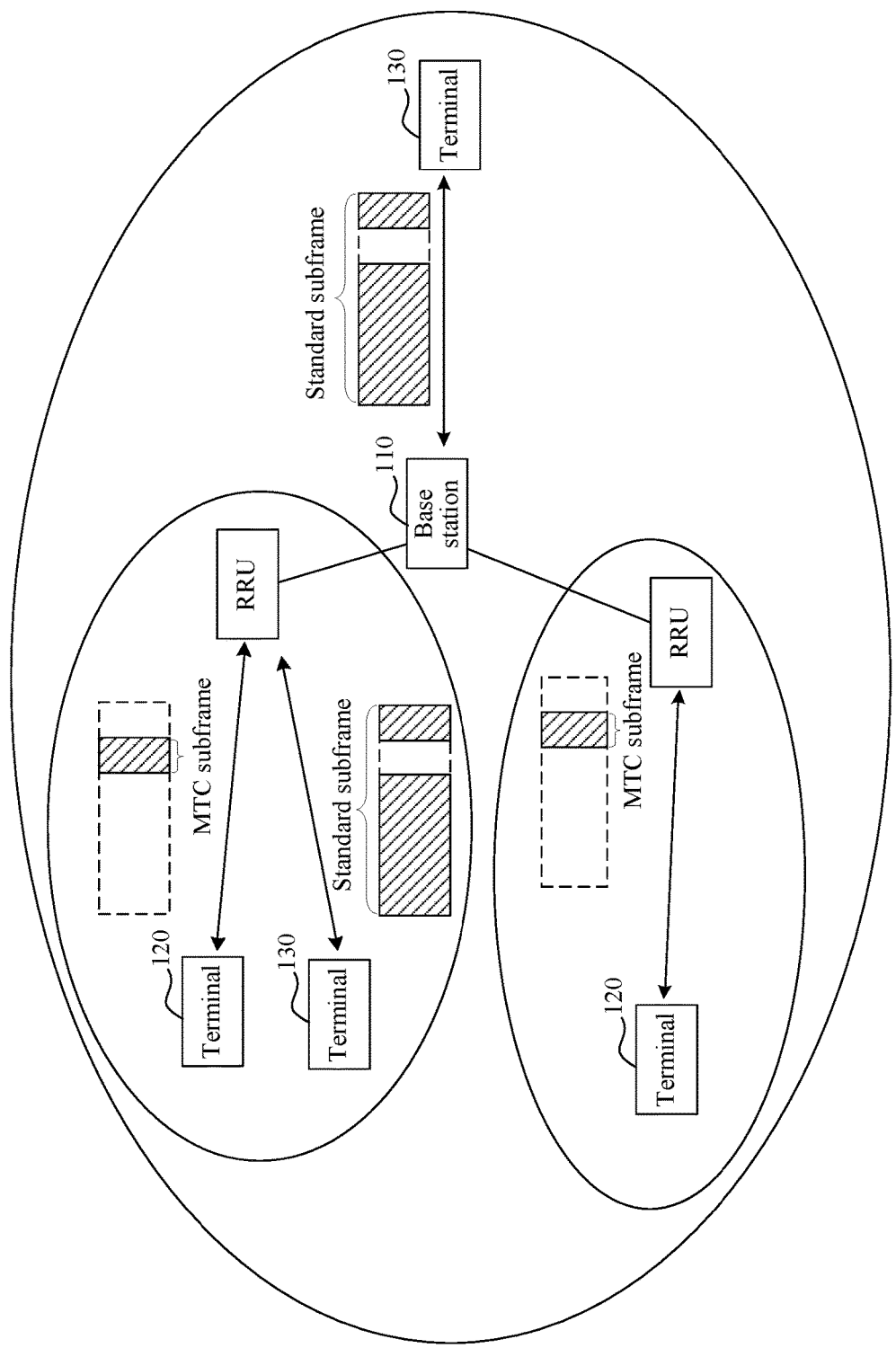
FIG. 11 is a schematic diagram of a communication method according to an embodiment of the present invention.

In the embodiment provided in FIG. 4 or FIG. 4B, when the base station 110 is a macro base station, at least one radio remote unit (RRU) may be arranged within coverage of the base station 110. As shown in FIG. 11, the base station 110 performs communication with the terminal 120 by using the MTC subframe, may perform communication with the terminal 120 by using the MTC subframe within coverage of the RRU, and may also perform communication with the non-MTC terminal 130 by using the standard subframe within the coverage of the RRU. Within the coverage of the RRU, when the base station 110 performs communication with the terminal 120 by using the MTC subframe and a particular frequency resource, the base station 110 performs communication with the non-MTC terminal 130 without using the particular frequency resource within a time segment of the MTC subframe. Within coverage rather than that of the RRU, the base station 110 may perform communication with the non-MTC terminal 130 by using the standard subframe, and a used frequency resource is different from the particular frequency resource used by the terminal 120 by using the MTC subframe within the coverage of the RRU. When multiple RRUs exist, within coverage of different RRUs, the base station 110 may separately perform communication with different MTC terminals 120 by using a same frequency resource, implementing the MTC service.

Figure 12:
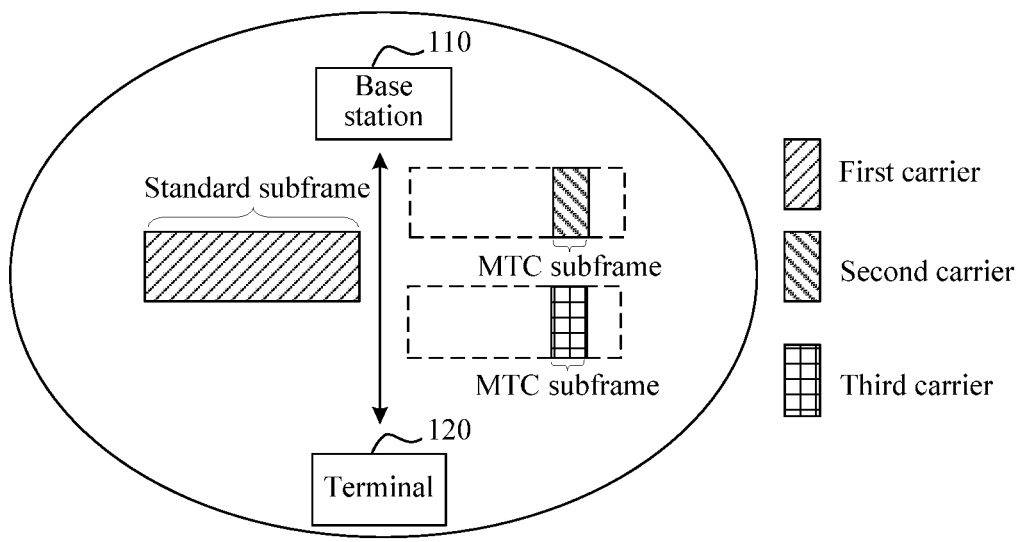
FIG. 12 is a schematic diagram of a communication method according to an embodiment of the present invention.

In the embodiment provided in FIG. 4 or FIG. 4B, when sending the resource configuration information of the MTC service, the base station 110 may use a first carrier, and the terminal 120 receives on the first carrier the resource configuration information of the MTC service that is sent by the base station 110. The downlink resource used for the MTC service is on a second carrier, the uplink resource used for the MTC service is on a third carrier, and frequencies of the first carrier, the second carrier, and the third carrier are different from each other. As shown in FIG. 12, the base station 110 may send the downlink data of the MTC service to the terminal 120 by using the second carrier and in the downlink MTC resource by using the MTC subframe as a transmission period. The terminal 120 may send the uplink data of the MTC service by using the third carrier and in the uplink MTC resource by using the MTC subframe as a transmission period.

In this embodiment of the present invention, as shown in FIG. 8, FIG. 9, FIG. 10, FIG. 11, or FIG. 12, all of the frequency resource occupied by the standard subframe is occupied in the MTC subframe. FIG. 8 to FIG. 12, as an embodiment of the present invention, are not limited to what is shown in FIG. 8 to FIG. 12. For example, the frequency resource of the shown MTC subframe may also occupy a portion of the frequency resource occupied by the standard subframe.

In this embodiment of the present invention, after the uplink MTC resource and/or the downlink MTC resource is configured, the configured uplink MTC resource and/or downlink MTC resource may further be reconfigured. The base station may send resource reconfiguration information to the terminal 120 by using a PDCCH or an ePDCCH, or may send resource reconfiguration information to the terminal 120 by using broadcast information, RRC signaling, or MAC signaling.

The resource reconfiguration information may be used to configure a dedicated resource for MTC subframe transmission for the terminal 120 or may configure a public resource for MTC subframe transmission. When the dedicated resource for MTC subframe transmission is reconfigured, the terminal 120 may find, according to the received resource reconfiguration information, a resource of an uplink MTC subframe allocated by the base station, and may perform communication according to the resource of the uplink MTC subframe, and/or may find, according to the received resource reconfiguration information, a downlink MTC subframe sent by the base station, so as to receive and demodulate the resource. When the public resource for MTC subframe transmission is reconfigured, the terminal 120 may replace the previously configured MTC subframe resource according to the MTC subframe resource indicated by the resource reconfiguration information, demodulate a PDCCH of the MTC subframe, and determine the allocated uplink MTC subframe resource, so as to perform communication by using the uplink MTC subframe resource, and/or replace the previously configured MTC subframe resource with the MTC subframe resource indicated by the resource reconfiguration information, to find a resource used for the downlink MTC subframe, and then parse a PDCCH channel of the MTC subframe on the resource used for the downlink MTC subframe, so as to find the downlink MTC subframe sent by the base station.

In this embodiment of the present invention, after the uplink MTC resource and/or the downlink MTC resource is configured, or after the configured uplink MTC resource and/or downlink MTC resource is reconfigured, the configured or reconfigured uplink MTC resource and/or downlink MTC resource may be further deleted. Resource deletion information may be sent to the terminal 120. For example, resource deletion information may be sent to the terminal 120 by using a PDCCH or an ePDCCH, or resource deletion information may be sent to the terminal 120 by using broadcast information, RRC signaling, or MAC signaling. The resource deletion information may be used to indicate all of the configured or reconfigured MTC subframe resource before deletion, or may be used to instruct to delete a specified and particular portion of the resource. After receiving the resource deletion information, the terminal 120 deletes the corresponding MTC subframe resource according to an instruction of the resource deletion information.

Figure 13:
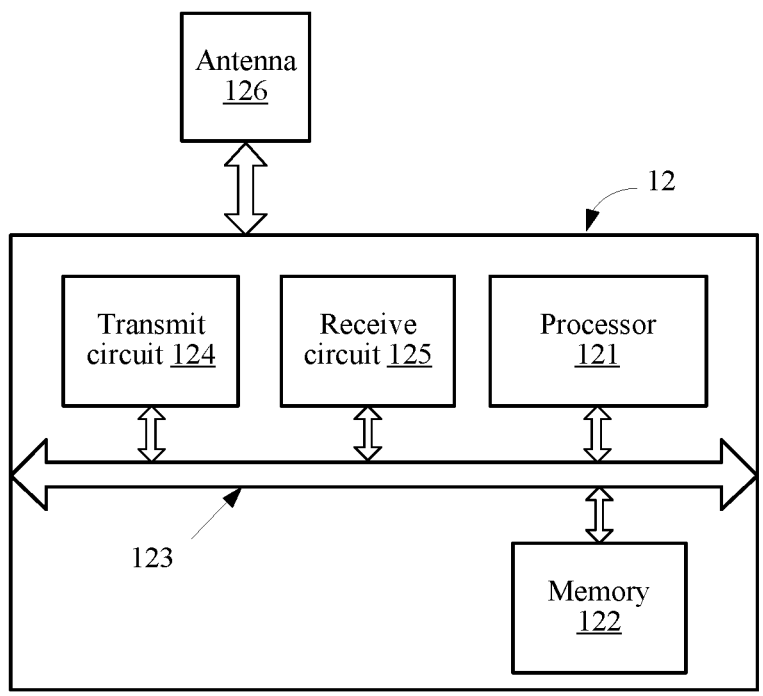
FIG. 13 is a schematic structural diagram of a communications apparatus according to an embodiment of the present invention.

As shown in FIG. 13, FIG. 13 shows a communications apparatus 12 according to an embodiment of the present invention, including a processor 121 and a memory 122. The processor 121 is connected to the memory 122 by using a bus 123. The communications apparatus 12 may be the base station 110 in the foregoing embodiments of the present invention or may be the terminal 120 in the foregoing embodiments of the present invention. When the communications apparatus 12 is the base station 110, the memory 122 is configured to store instructions enabling the processor 121 to execute the following operations: obtaining resource configuration information of a machine type communications MTC service, where the resource configuration information of the MTC service includes information about an uplink MTC resource and information about a downlink MTC resource; sending the resource configuration information of the MTC service to an MTC terminal; sending downlink control information of the MTC service to the MTC terminal, where the downlink control information indicates information about a resource used for transmitting downlink data of the MTC service, and the resource used for transmitting the downlink data of the MTC service is located in the downlink MTC resource; sending the downlink data of the MTC service to the MTC terminal, in the resource used for transmitting the downlink data of the MTC service, by using the MTC subframe as a transmission period, where a quantity of symbols included in the MTC subframe is configured according to a transmission delay of the MTC service; and receiving uplink data of the MTC service that is sent by the MTC terminal in the uplink MTC resource by using the MTC subframe as a transmission period.

When the communications apparatus 12 is the base station 110, the memory 122 may be further configured to store instructions enabling the processor 121 to execute the following operations: obtaining resource configuration information of a machine type communications MTC service, where the resource configuration information of the MTC service includes at least one of information about an uplink MTC resource or information about a downlink MTC resource; sending the resource configuration information of the MTC service to an MTC terminal; and performing MTC service transmission with the MTC terminal by using an MTC subframe in the uplink MTC resource and/or the downlink MTC resource.

Further, the memory 122 may further include instructions for executing operations of the base station 110 in the embodiments shown in FIG. 1 to FIG. 12.

When the communications apparatus 12 is the terminal 120, the memory 122 is configured to store instructions enabling the processor 121 to execute the following operations: receiving resource configuration information of an MTC service that is sent by a base station, where the resource configuration information of the MTC service includes information about an uplink MTC resource and information about a downlink MTC resource; receiving downlink control information of the MTC service that is sent by the base station, where the downlink control information indicates information about a resource used for transmitting downlink data of the MTC service, and the resource used for transmitting the downlink data of the MTC service is located in the downlink MTC resource; receiving the downlink data of the MTC service that is sent by the base station to an MTC terminal, in the resource used for transmitting the downlink data of the MTC service, by using the MTC subframe as a transmission period, where the quantity of the symbols included in the MTC subframe is configured according to a transmission delay of the MTC service; and sending uplink data of the MTC service in the uplink MTC resource by using the MTC subframe as a transmission period.

When the communications apparatus 12 is the terminal 120, the memory 122 is configured to store instructions enabling the processor 121 to execute the following operations: receiving resource configuration information of an MTC service that is sent by a base station, where the resource configuration information of the MTC service includes at least one of information about an uplink MTC resource or information about a downlink MTC resource; determining the uplink MTC resource and/or the downlink MTC resource according to the resource configuration information of the MTC service; and performing MTC service transmission with the base station by using an MTC subframe in the uplink MTC resource and/or the downlink MTC resource.

Further, the memory 122 may further include instructions for executing operations of the terminal 120 in the embodiments shown in FIG. 1 to FIG. 12.

Besides, the communications apparatus 12 may further include a transmit circuit 124, a receive circuit 125, an antenna 126, and the like. The processor 121 controls operations of the communications apparatus 12. The processor 121 may also be referred to as a CPU (Central Processing Unit). The memory 122 may include a read-only memory and a random access memory and provides instructions and data to the processor 121. A part of the memory 122 may further include a non-volatile random access memory (NVRAM). In a specific application, the transmit circuit 124 and the receive circuit 125 may be coupled to the antenna 126. Components of the communications apparatus 12 are coupled together by using a bus system 123. Besides including a data bus, the bus system 123 may further include a power bus, a control bus, a status signal bus, and the like. However, for purpose of clear description, various types of buses in the figure are all marked as the bus system 123.

The methods disclosed in the foregoing embodiments of the present invention may be applied to the processor 121, or are implemented by the processor 121. The processor 121 may be an integrated circuit chip and has a signal processing capability. In an implementation process, steps of the foregoing methods may be performed by using an integrated logic circuit of hardware in the processor 121 or an instruction in a form of software. The foregoing processor 121 may be a general purpose processor, a digital signal processor (DSP), an application-specific integrated circuit (ASIC), a field programmable gate array (FPGA), or another programmable logic device, discrete gate or transistor logic device, or discrete hardware component.

This embodiment of the present invention further provides a computer program, used to enable a computer to execute the following steps: obtaining resource configuration information of a machine type communications MTC service, where the resource configuration information of the MTC service includes information about an uplink MTC resource and information about a downlink MTC resource; sending the resource configuration information of the MTC service to an MTC terminal; sending downlink control information of the MTC service to the MTC terminal, where the downlink control information indicates information about a resource used for transmitting downlink data of the MTC service, and the resource used for transmitting the downlink data of the MTC service is located in the downlink MTC resource; sending the downlink data of the MTC service to the MTC terminal, in the resource used for transmitting the downlink data of the MTC service, by using the MTC subframe as a transmission period, where a quantity of symbols included in the MTC subframe is configured according to a transmission delay of the MTC service; and receiving uplink data of the MTC service that is sent by the MTC terminal in the uplink MTC resource by using the MTC subframe as a transmission period.

Alternatively, the computer program is used to enable the computer to execute the following steps: receiving resource configuration information of an MTC service that is sent by a base station, where the resource configuration information of the MTC service includes information about an uplink MTC resource and information about a downlink MTC resource; receiving downlink control information of the MTC service that is sent by the base station, where the downlink control information indicates information about a resource used for transmitting downlink data of the MTC service, and the resource used for transmitting the downlink data of the MTC service is located in the downlink MTC resource; receiving the downlink data of the MTC service that is sent by the base station to an MTC terminal, in the resource used for transmitting the downlink data of the MTC service, by using the MTC subframe as a transmission period, where the quantity of the symbols included in the MTC subframe is configured according to a transmission delay of the MTC service; and sending uplink data of the MTC service in the uplink MTC resource by using the MTC subframe as a transmission period.

Alternatively, the computer program is used to enable the computer to execute the following steps: obtaining resource configuration information of a machine type communications MTC service, where the resource configuration information of the MTC service includes at least one of information about an uplink MTC resource or information about a downlink MTC resource; sending the resource configuration information of the MTC service to an MTC terminal; and performing MTC service transmission with the MTC terminal by using an MTC subframe in the uplink MTC resource and/or the downlink MTC resource.

Alternatively, the computer program is used to enable the computer to execute the following steps: receiving resource configuration information of an MTC service that is sent by a base station, where the resource configuration information of the MTC service includes at least one of information about an uplink MTC resource or information about a downlink MTC resource; determining, by the MTC terminal, the uplink MTC resource and/or the downlink MTC resource according to the resource configuration information of the MTC service; and performing, by the MTC terminal, MTC service transmission with the base station by using an MTC subframe in the uplink MTC resource and/or the downlink MTC resource.

The computer program can be stored in a computer readable storage medium.

A person skilled in the art can understand that information and data can be represented by using any technique. For example, data, instructions, a command, information, a signal, a bit, symbols, and a chip may be represented by a voltage, a current, an electromagnetic wave, a magnetic field, or magnetic particles, or an optical field or optical particles, or any combination of the above.

A person skilled in the art may further understand that various illustrative logical blocks and steps that are listed in the embodiments of the present invention may be implemented by using electronic hardware, computer software, or a combination thereof. In order to clearly display the interchangeability between the hardware and the software, functions of the foregoing various illustrative components and steps have been generally described. Whether the functions are implemented by using hardware or software depends on particular applications and a design requirement of the entire system. A person skilled in the art may use various methods to implement the described functions for each particular application, but it should not be considered that the implementation goes beyond the protection scope of the embodiments in the present invention.

The various illustrative logical blocks, modules, and circuits described in the embodiments of the present invention may implement or operate the described functions by using a general processing unit, a digital signal processing unit, an application-specific integrated circuit (ASIC), a field programmable gate array (FPGA) or another programmable logical apparatus, a discrete gate or transistor logic, a discrete hardware component, or a design of any combination thereof. The general processing unit may be a microprocessing unit. Optionally, the general processing unit may be any conventional processing unit, controller, microcontroller, or state machine. The processing unit may also be implemented by a combination of computing apparatuses, such as a digital signal processing unit and a microprocessing unit, multiple microprocessing units, one or more microprocessing units with a digital signal processing unit core, or any other similar configuration.

Steps of the methods or algorithms described in the embodiments of the present invention may be directly embedded into hardware, a software module executed by a processing unit, or a combination thereof. The software module may be stored in a RAM memory, a flash memory, a ROM memory, an EPROM memory, an EEPROM memory, a register, a hard disk, a removable magnetic disk, a CD-ROM, or a storage medium of any other form in the art. For example, the storage medium may connect to a processing unit so that the processing unit may read information from the storage medium and write information to the storage medium. Alternatively, the storage medium may be further integrated into a processing unit. The processing unit and the storage medium may be configured in an ASIC, and the ASIC may be configured in a user terminal. Alternatively, the processing unit and the storage medium may also be configured in different components of the user terminal.

In one or more design examples, the functions described in the embodiments of the present invention may be implemented by using hardware, software, firmware, or any combination thereof. If the present invention is implemented by software, these functions may be stored in a computer-readable medium or are transmitted to the computer-readable medium in a form of one or more instructions or code. The computer-readable medium is either a computer storage medium or a communications medium that enables a computer program to move from one place to another. The storage medium may be an available medium that may be accessed by any general or special computer. For example, such a computer-readable medium may include but is not limited to a RAM, a ROM, an EEPROM, a CD-ROM, or another optical disc storage, a disk storage or another magnetic storage apparatus, or any other medium that may be used to bear or store program code, where the program code is in a form of an instruction or a data structure or in a form that can be read by a general or special computer or a general or special processing unit. In addition, any connection may be appropriately defined as a computer-readable medium. For example, if software is transmitted from a website, a server, or another remote resource by using a coaxial cable, an optical fiber cable, a twisted pair, a digital subscriber line (DSL) or in a wireless manner, such as infrared, radio, or microwave, the software is included in a defined computer-readable medium. The disc and the disk include a compressed disk, a laser disk, an optical disc, a DVD, a floppy disk, and a Blue-ray disc. The disk generally copies data by a magnetic means, and the disc generally copies data optically by a laser means. The foregoing combination may also be included in the computer-readable medium.

According to the foregoing description of this specification in the present invention, technologies in the art may use or implement the content of the present invention. Any modification based on the disclosed content shall be considered obvious in the art. The basic principles described in the present invention may be applied to other variations without departing from the essence and scope of the present invention. Therefore, the content disclosed in the present invention is not limited to the described embodiments and designs but may also be extended to a maximum scope that is consistent with the principles and disclosed new features of the present invention.

What is claimed is:

1. A communication method comprising:
   receiving, by a terminal, resource configuration information of a machine type communications (MTC) service that is sent from a base station in a first carrier, wherein the resource configuration information of the MTC service comprises information about a downlink MTC resource and information about an uplink MTC resource;
   determining, by the terminal, the downlink MTC resource and the uplink MTC resource according to the resource configuration information of the MTC service;
   receiving, by the terminal, downlink data of the MTC service sent from the base station in the MTC downlink resource in a second carrier; and
   sending, by the terminal, uplink data of the MTC service to the base station in the uplink MTC resource in a third carrier, wherein the first carrier, the second carrier and the third carrier are different carriers.

2. The method according to claim 1, wherein the resource configuration information of the MTC service further comprises configuration information of a MTC subframe, and the configuration information of the MTC subframe comprises a quantity of symbols comprised in the MTC subframe.

3. The method according to claim 1, wherein a quantity of symbols comprised in a MTC subframe is less than a quantity of symbols comprised in a standard subframe.

4. The method according to claim 1, wherein the receiving comprises:
   receiving, by the terminal, the resource configuration information of the MTC service that is sent from the base station by using a physical downlink control channel (PDCCH) in a standard subframe.

5. The method according to claim 1, wherein the receiving comprises:
   receiving, by the terminal, the resource configuration information of the MTC service that is sent from the base station by using an enhanced PDCCH in a standard subframe.

6. The method according to claim 1, further comprising:
   receiving, by the terminal, downlink control information of the MTC service that is sent from the base station, wherein the downlink control information indicates information about a resource used for transmitting the downlink data of the MTC service and information about a resource used for transmitting the uplink data of the MTC service, and the resource used for transmitting the downlink data of the MTC service is located in the downlink MTC resource,
   the resource used for transmitting the uplink data of the MTC service is located in the uplink MTC resource.

7. The method according to claim 6, wherein the receiving of the downlink control information of the MTC service comprises:
   receiving, by the terminal, the downlink control information of the MTC service that is sent from the base station on a physical downlink control channel (PDCCH) of the downlink MTC resource by using a MTC subframe as a transmission period.

8. The method according to claim 1, further comprising:
   receiving, by the terminal, a spreading code that is sent from the base station and that is used for MTC service downlink transmission; and
   wherein the receiving of the downlink data of the MTC service comprises:
   receiving, by the terminal, according to the spreading code used for MTC service downlink transmission and in the downlink MTC resource by using a MTC subframe as a transmission period, the downlink data of the MTC service that is sent from the base station.

9. The method according to claim 1, wherein a quantity of symbols comprised in a MTC subframe is configured according to a transmission delay of the MTC service.

10. The method according to claim 1, wherein the downlink data of the MTC service is received and the uplink data of the MTC service is sent by using a MTC subframe as a transmission period.

11. A terminal comprising:
   a transceiver configured to receive resource configuration information of a machine type communications (MTC) service that is sent from a base station in a first carrier, wherein the resource configuration information of the MTC service comprises information about a downlink MTC resource and information about an uplink MTC resource; and
   a processor; and
   a memory storing a program to be executed in the processor, the program comprising instructions for determining the downlink MTC resource and the uplink MTC resource according to the resource configuration information of the MTC service, wherein the transceiver is further configured to receive downlink data of the MTC service sent from the base station in the MTC downlink resource in a second carrier, and send uplink data of the MTC service to the base station in the uplink MTC resource in a third carrier, wherein the first carrier, the second carrier and the third carrier are different carriers.

12. The terminal according to claim 11, wherein the resource configuration information of the MTC service further comprises configuration information of a MTC subframe, and the configuration information of the MTC subframe comprises a quantity of symbols comprised in the MTC subframe.

13. The terminal according to claim 11, wherein a quantity of symbols comprised in a MTC subframe is less than a quantity of symbols comprised in a standard subframe.

14. The terminal according to claim 11, wherein the transceiver is configured to receive the resource configuration information of the MTC service that is sent from the base station by using a physical downlink control channel (PDCCH) in a standard subframe.

15. The terminal according to claim 11, wherein the transceiver is configured to receive the resource configuration information of a MTC subframe that is sent from the base station by using an enhanced PDCCH in a standard subframe.

16. The terminal according to claim 11, wherein the transceiver is further configured to receive downlink control information of the MTC service that is sent from the base station, wherein the downlink control information indicates information about a resource used for transmitting the downlink data of the MTC service and information about a resource used for transmitting the uplink data of the MTC service, and the resource used for transmitting the downlink data of the MTC service is located in the downlink MTC resource, the resource used for transmitting the uplink data of the MTC service is located in the uplink MTC resource.

17. The terminal according to claim 16, wherein
the transceiver is configured to receive the downlink control information of the MTC service that is sent from the base station on a physical downlink control channel (PDCCH) of the downlink MTC resource by using a MTC subframe as a transmission period.

18. The terminal according to claim 11, wherein the transceiver is further configured to receive a spreading code that is sent from the base station and that is used for MTC service downlink transmission; and the transceiver is further configured to: receive, according to the spreading code used for MTC service downlink transmission and in the downlink MTC resource by using a MTC subframe as a transmission period, the downlink data of the MTC service that is sent from the base station.

19. The terminal according to claim 11, wherein a quantity of symbols comprised in a MTC subframe is configured according to a transmission delay of the MTC service.

20. The terminal according to claim 11, wherein the downlink data of the MTC service is received and the uplink data of the MTC service is sent by using a MTC subframe as a transmission period.

* * * * *

UNITED STATES PATENT AND TRADEMARK OFFICE
CERTIFICATE OF CORRECTION

PATENT NO. : 10,306,440 B2  
APPLICATION NO. : 15/637907  
DATED : May 28, 2019  
INVENTOR(S) : Tianle Deng et al.

Page 1 of 1

It is certified that error appears in the above-identified patent and that said Letters Patent is hereby corrected as shown below:

On the Title Page

Preceding Item (51) Int. Cl., insert:
--(30) Foreign Application Priority Data
Dec. 31, 2014 (WO) ............. PCT/CN2014/096020--.

Signed and Sealed this
Twenty-seventh Day of August, 2019

Andrei Iancu
*Director of the United States Patent and Trademark Office*